Jan. 27, 1953 R. H. ROBINSON 2,626,804
RACKET FOR TENNIS AND BATTING GAMES
Filed July 19, 1944 9 Sheets-Sheet 1
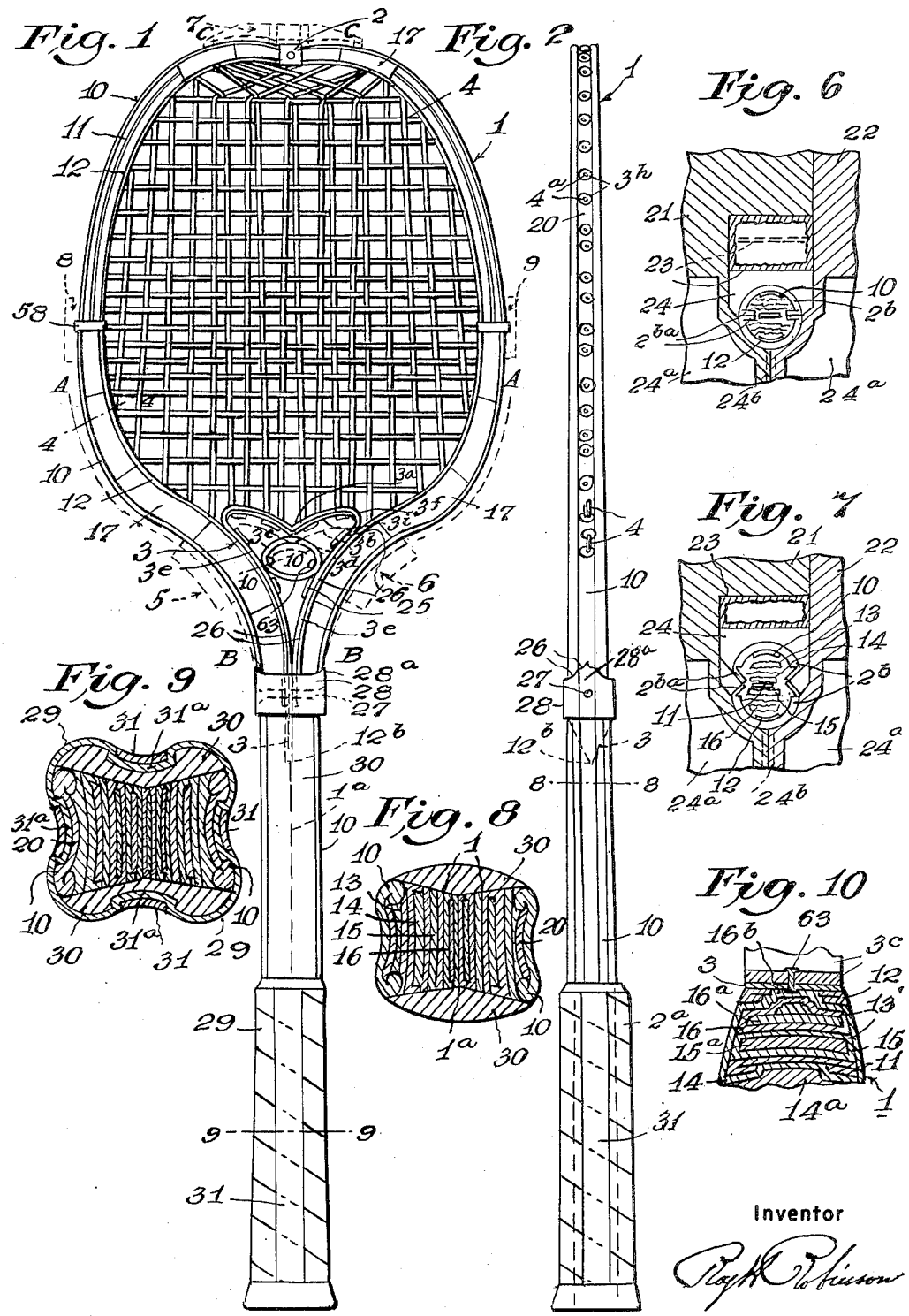
Inventor
Ralph Robinson Jan. 27, 1953     R. H. ROBINSON     2,626,804
RACKET FOR TENNIS AND BATTING GAMES
Filed July 19, 1944     9 Sheets-Sheet 2
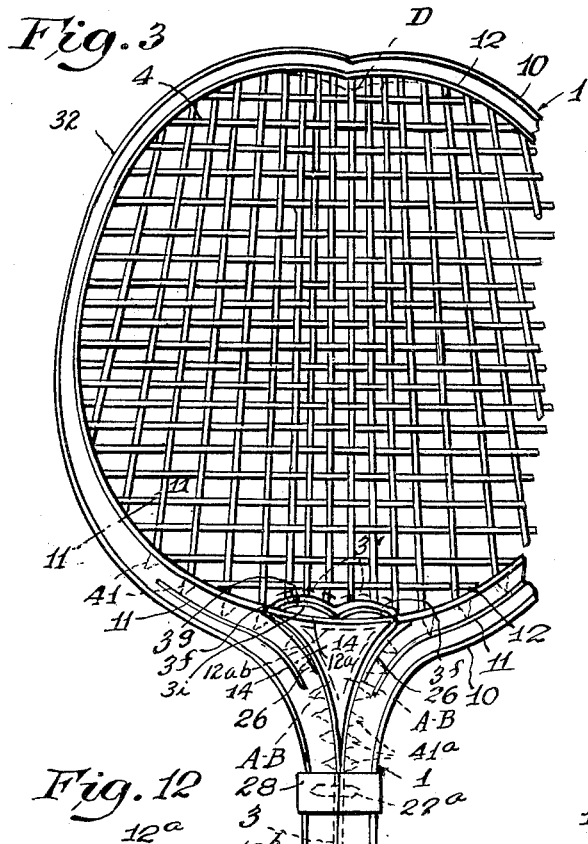
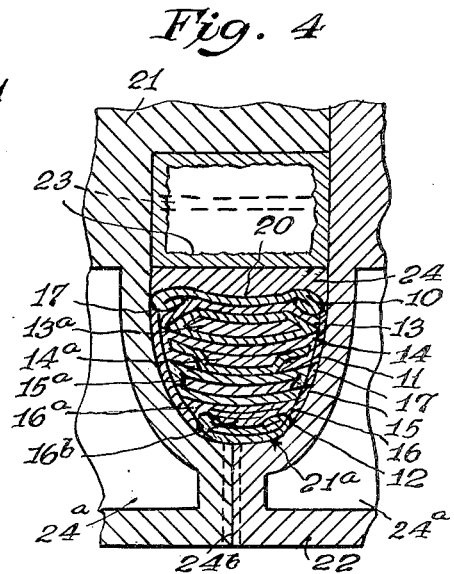
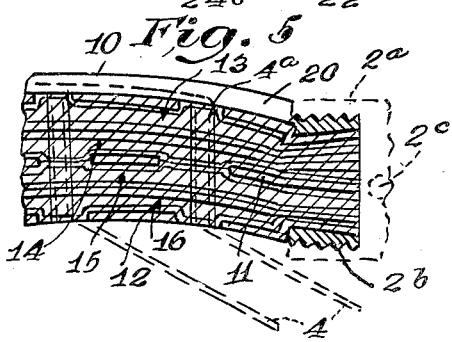
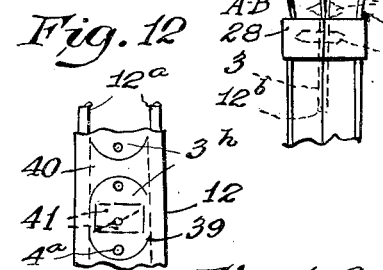
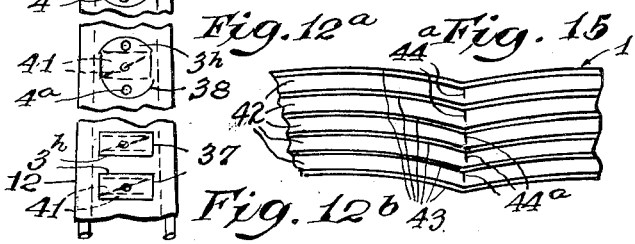
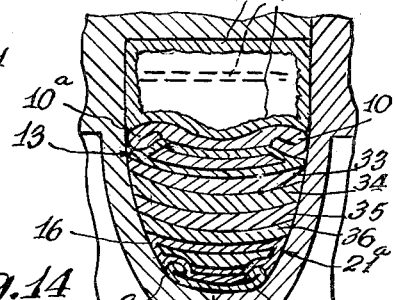
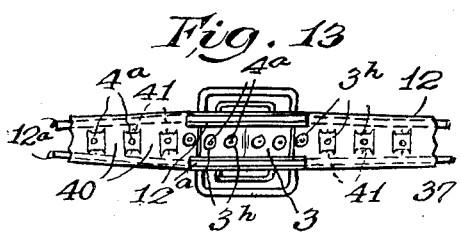
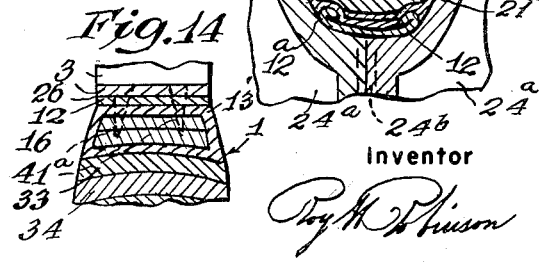
Inventor
Roy H. Robinson Jan. 27, 1953     R. H. ROBINSON     2,626,804
RACKET FOR TENNIS AND BATTING GAMES
Filed July 19, 1944     9 Sheets-Sheet 3
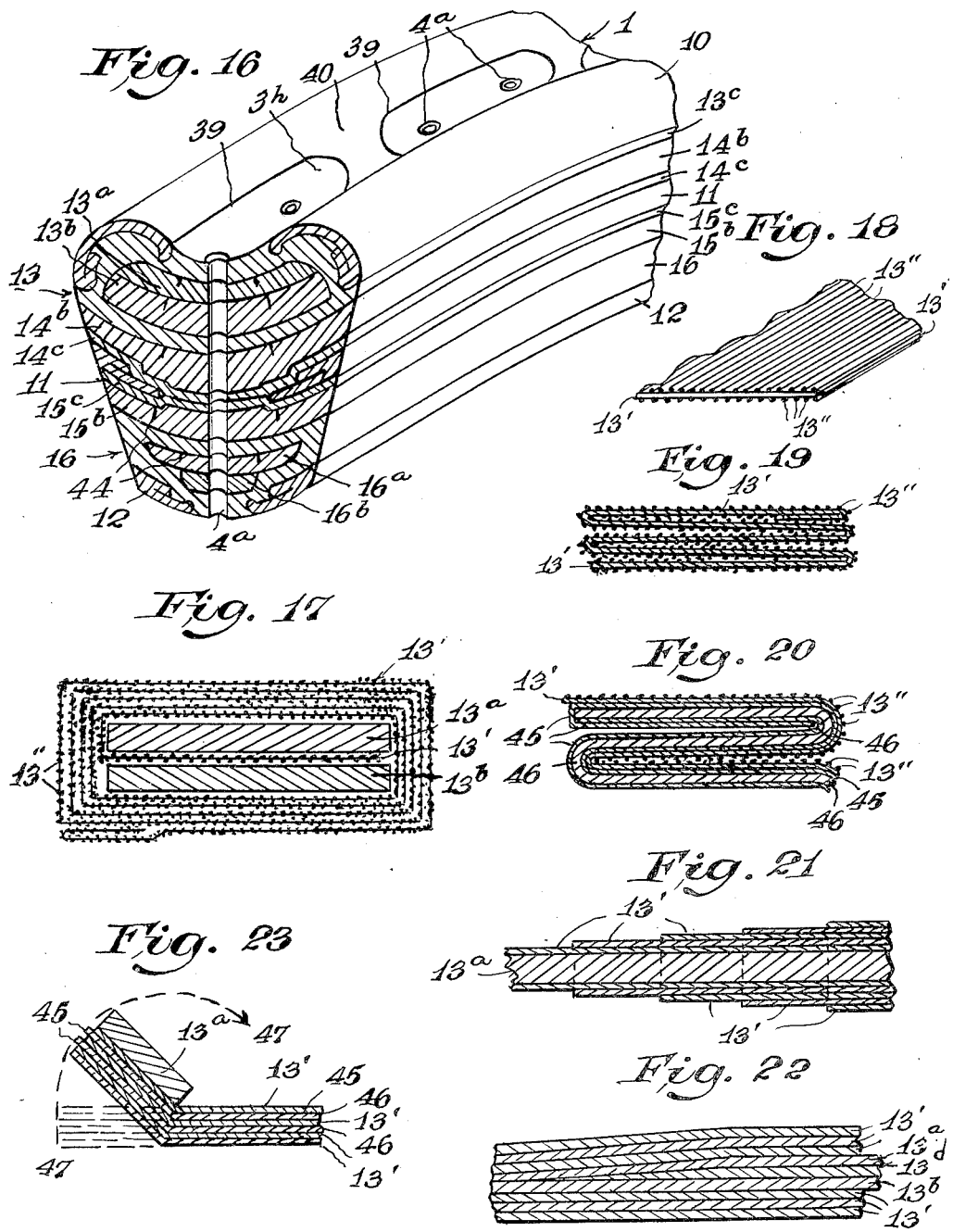
Inventor
Ralph Robinson

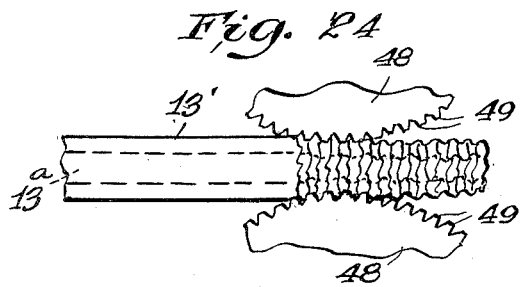
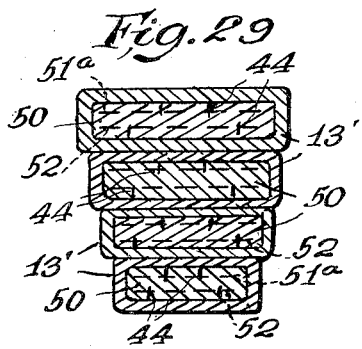
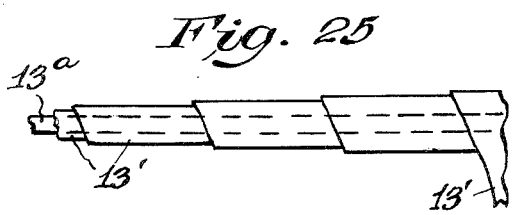
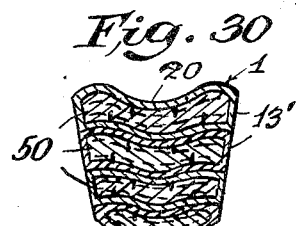
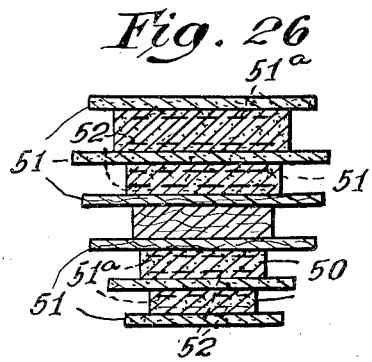
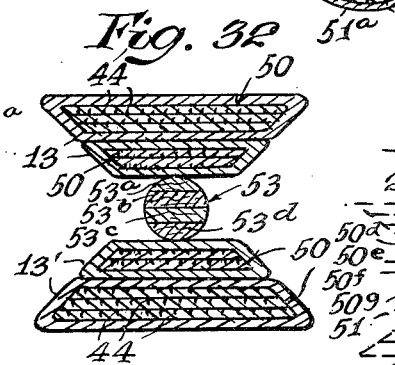
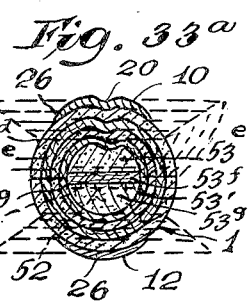
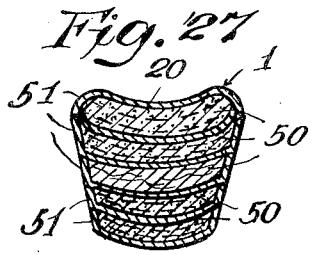
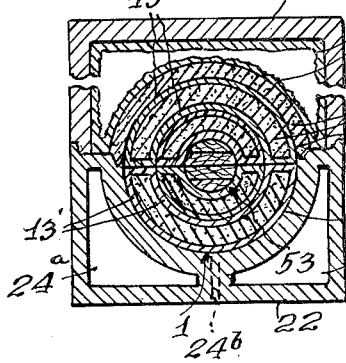
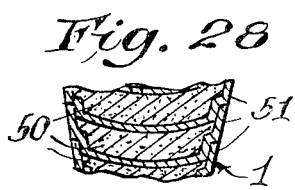

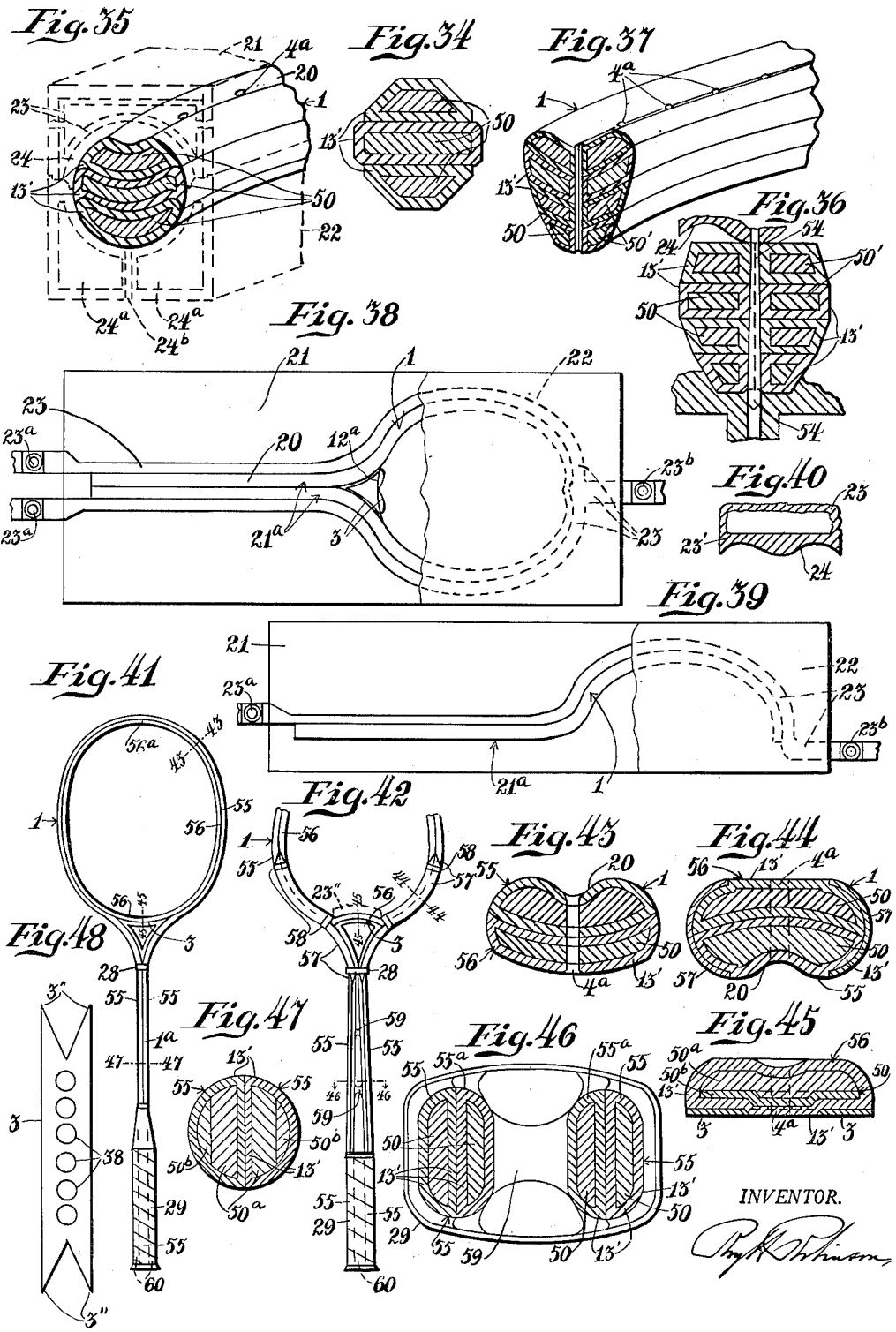

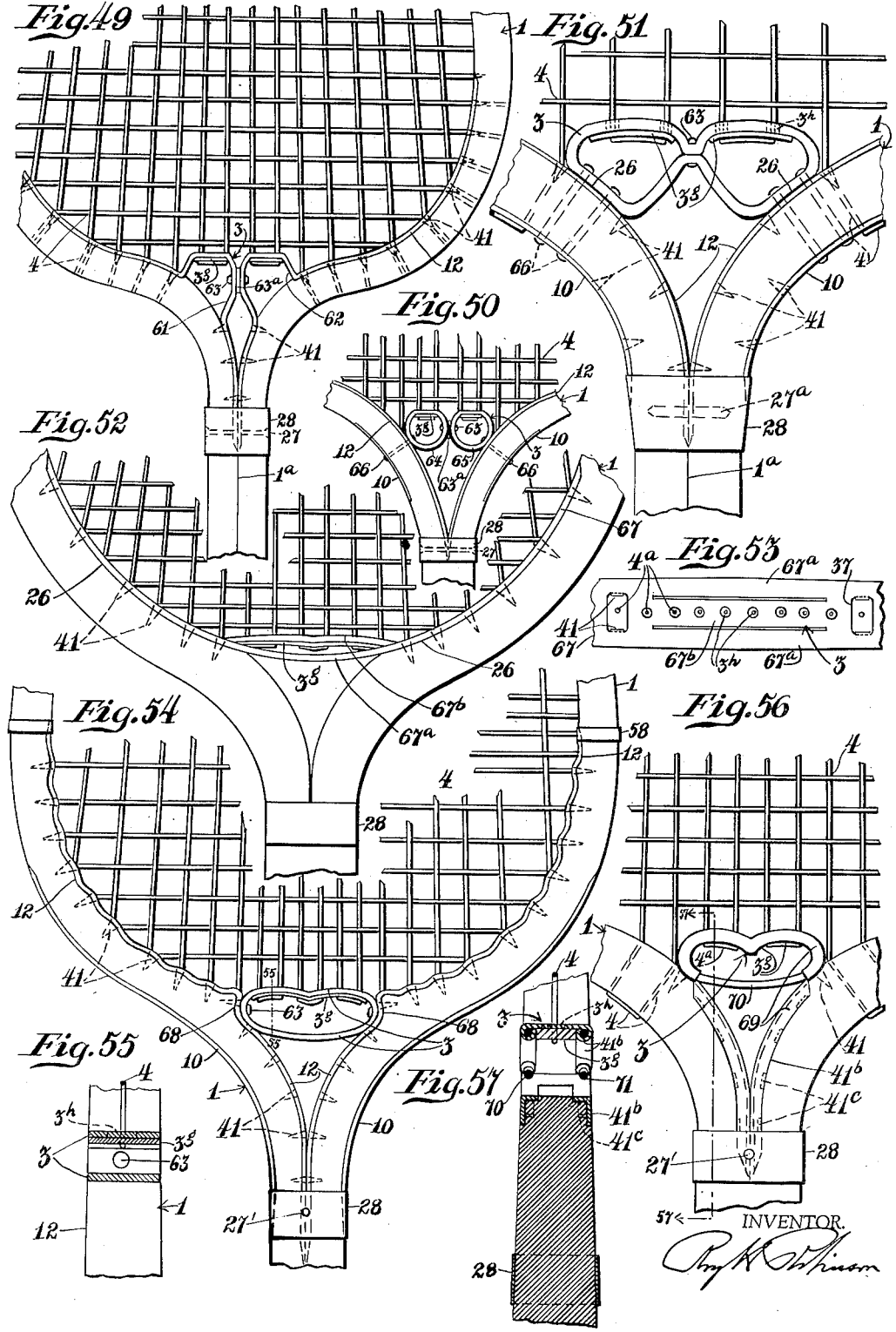

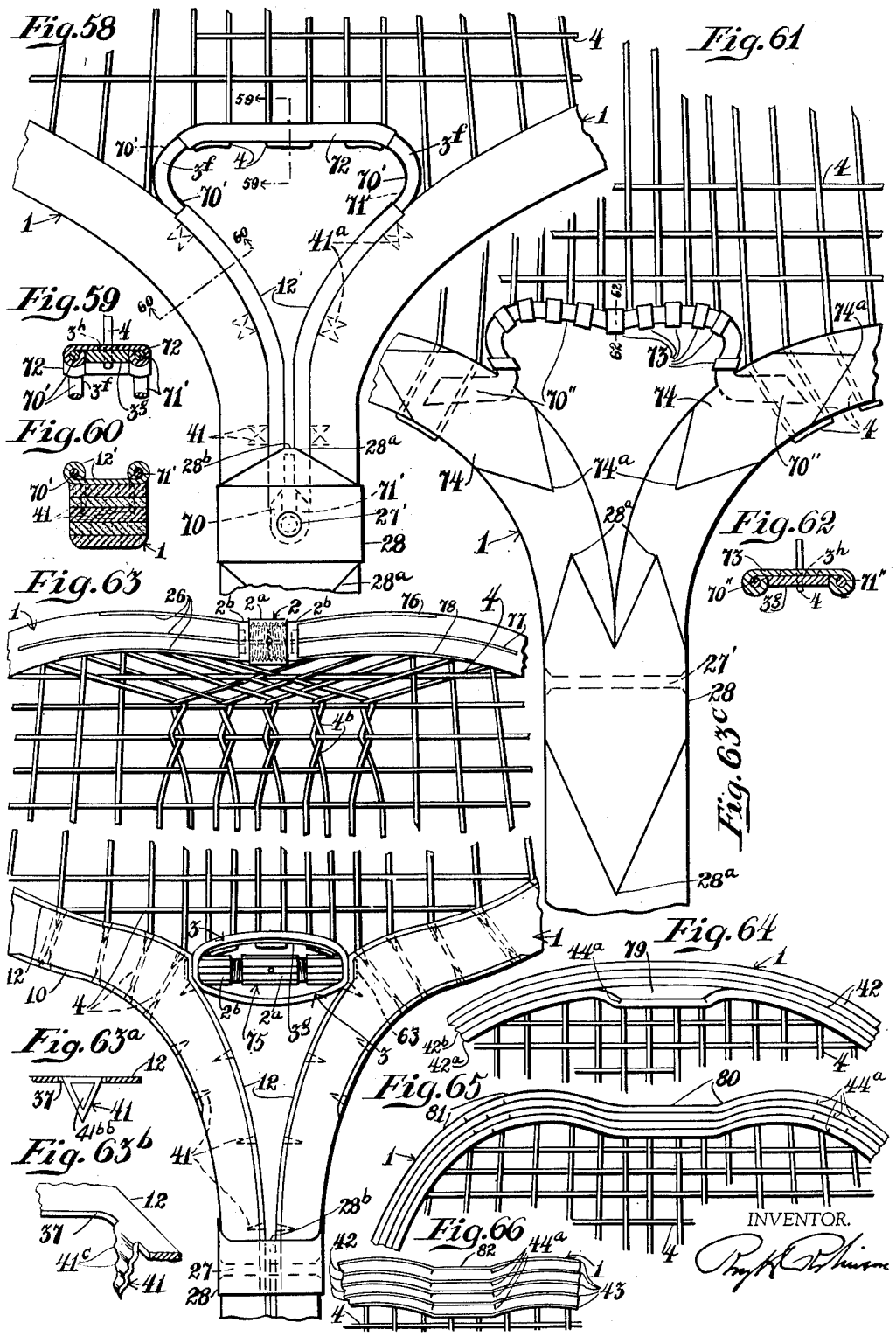

Jan. 27, 1953 R. H. ROBINSON 2,626,804
RACKET FOR TENNIS AND BATTING GAMES
Filed July 19, 1944 9 Sheets-Sheet 8
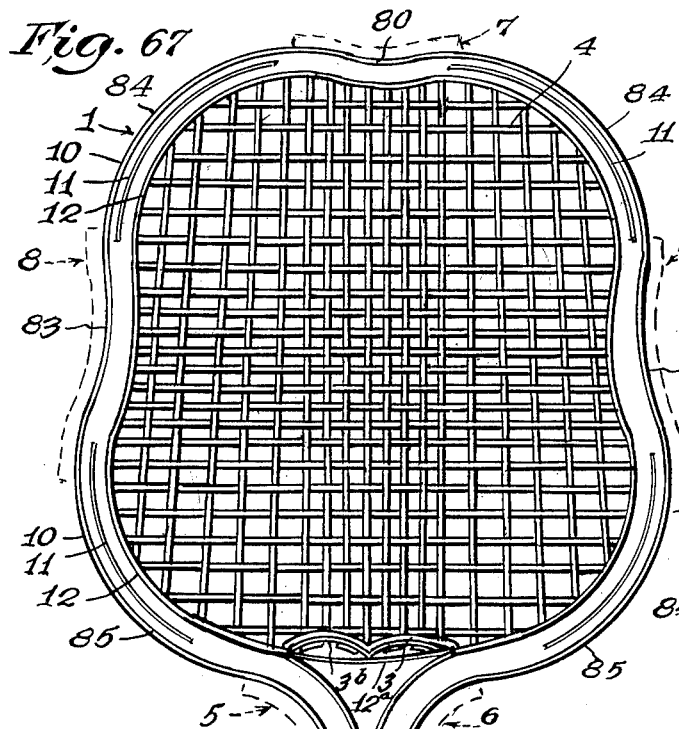
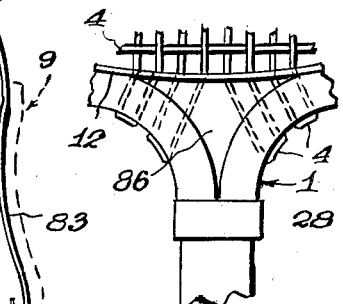
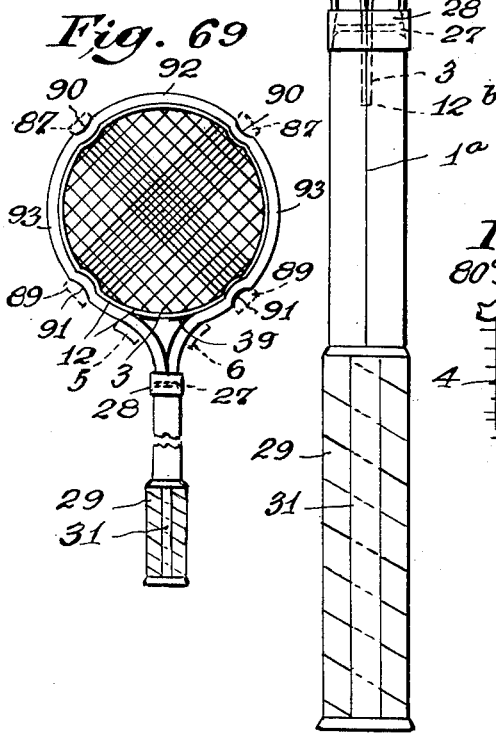
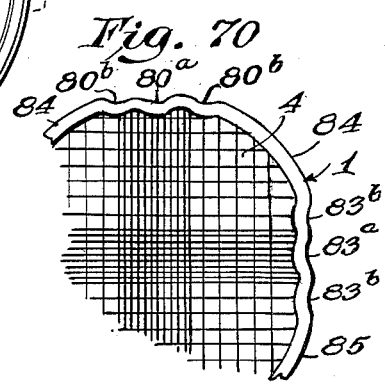
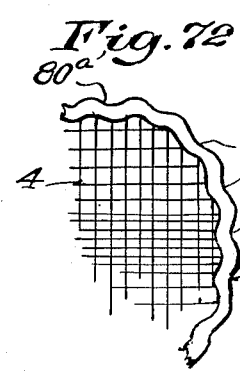
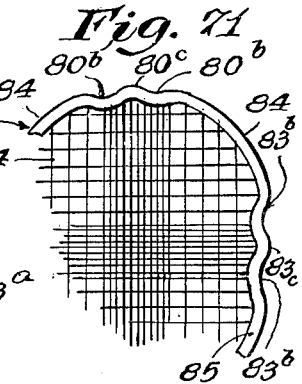
Inventor
Roy H. Robinson

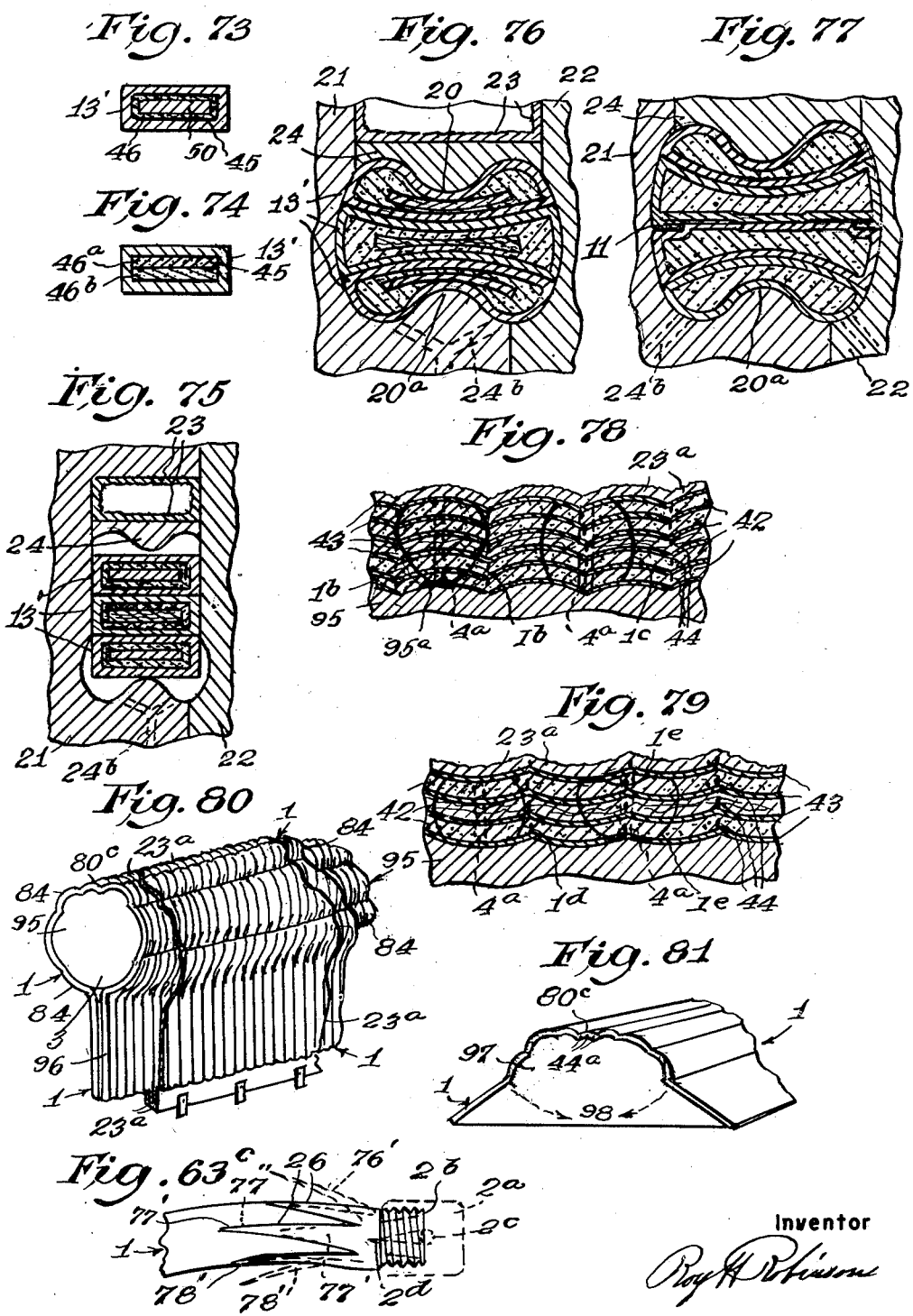

Patented Jan. 27, 1953

2,626,804

UNITED STATES PATENT OFFICE 2,626,804

RACKET FOR TENNIS AND BATTING GAMES

Roy H. Robinson, Chicago, Ill.

Application July 19, 1944, Serial No. 545,630

62 Claims. (Cl. 273—73)

This invention relates to rackets for tennis, squash, racquets, badminton and any batting game and to light-weight frame construction having a relatively high strength-weight ratio.

One of the primary objects of the invention is to provide a highly resilient springlike frame in combination with a contractable and expandable head frame and throat so as to secure maximum string tightness and reaction to ball impact while at the same time relieving the strain on the stringing both in play and while the racket is at rest.

My invention further consists of various novel improvements and adaptations in the construction disclosed in my prior Patents No. 1,470,878 of October 16, 1923, No. 1,636,867 of July 26, 1927, No. 1,676,051 of July 3, 1928, No. 1,862,531 of June 14, 1932, No. 1,930,285 of October 10, 1933, No. 1,937,787 of December 5, 1933, No. 2,171,223 of August 29, 1939 and application Serial No. 455,350, filed August 19, 1942 (now abandoned) and application Serial No. 492,914, filed June 30, 1943 (now Patent No. 2,593,714, issued April 22, 1952), as well as embodying other novel features.

A further important object of my invention is to adapt the use of my unique spring-throat and also my turnbuckle expanders to racket frames formed of other materials than metal tubing and particularly to wooden frames and to new and novel laminated frames of a highly resilient nature designed particularly to work with and still further step-up the action of these speed enhancing elements.

A still further object is to combine with these improvements a novel arrangement of stringing in these resilient and adjustable frames so as to derive a maximum advantage therefrom and secure a high tension stringing producing the fastest possible game in conjunction therewith.

Another object is to provide against customary frame distortions which are common to present day frames and which would be still further increased by this high tension arrangement of the stringing which this invention makes possible and, in addition, to relieve the strain on the critical central longitudinal strings of the racket which are the most vulnerable, suffer the greatest strains and receive most of the direct ball impacts.

A further object is an arrangement of the grain axis of adjacent wood liminations in relation to each other in a way which has not heretofore been applied to rackets on the market and which produces new and different stress resistance and resilience in the frame not heretofore present therein.

A further prime objective is the production of a laminated frame cross section, unique in the selection, combination, shaping and treatment of the materials employed, and so as to produce a frame of great resilience and high stress resistance to the violent and fatiguing strains to which a racket is subjected in hard play and with a low collective specific gravity and a cross section of minimum and reduced size and offering minimum air resistance in stroking the ball.

Another object is to reduce manufacturing costs and improve quality.

Other important objectives are to improve the shape of the racket, the construction and appearance of the handle and frame, the strengthening of the open throat, particularly when employed with frames formed wholly or partly of wood, and giving same resilient reaction heretofore unknown in such type of frames, the novel and graduated reinforcement of such frames, not heretofore provided, and the combination of a variety of resilient means acting at one and the same time to produce the ultimate in fast play.

With the above and other objects in view, the invention consists of certain novel combinations and arrangements of parts, the relations of which will be more thoroughly established in the following description particularly emphasizing and pointing out the same.

In the accompanying drawings:

Fig. 1 is a front elevation of a racket built in accordance with my invention.

Fig. 2 is a fragmentary side elevation of the racket of Fig. 1.

Fig. 3 is a fragmentary front elevation of another form of the racket.

Fig. 4 is a sectional view of the frame of Fig. 1 taken on the line 4—4 and a mold form for forming same, shown fragmentarily.

Fig. 5 is a fragmentary longitudinal cross section of a turnbuckle connection for a frame of the type of Fig. 1.

Figs. 6 and 7 are end views of the turnbuckle arrangement of Fig. 5, shown after and before forming in the molding form, shown fragmentarily.

Figs. 8 and 9 are cross sectional views of the shank and handle of the racket taken on lines 8—8 of Fig. 2 and 9—9 of Fig. 1, respectively.

Fig. 10 is a fragmentary sectional view of the frame and bridge element taken on line 10—10 of Fig. 1.

Fig. 11 is a cross sectional view of the frame taken on line 11—11 of Fig. 3, and a mold form for forming same, shown fragmentarily.

Figs. 12, 12a and 12b are fragmentary plan views of the longitudinal metal or tensile reinforcement on the inner face of the frame as in Fig. 3 and showing somewhat diagrammatically various ways of slotting and toothing same and bonding with interprojecting bosses of the adjacent frame material.

Fig. 13 is a fragmentary plan view of the spring bridge piece of the frame of Fig. 3.

Fig. 14 is a fragmentary cross sectional view of the frame of Fig. 3 taken on line 14—14.

Fig. 15 is a fragmentary front elevation of the upper end of a racket frame of laminated construction and similar in shape to the frame of Fig. 3.

Fig. 16 is a sectional perspective fragmentary view showing another form of the frame construction.

Fig. 17 is a diagrammatical sectional view showing a form of wrapping of the laminated construction for use in frames as in Figs. 4, 11, 16 and subsequent figures.

Fig. 18 is a diagrammatical perspective fragmentary view of a sheet of reinforced wrapping material for use in Fig. 17 and subsequent figures.

Fig. 19 is a fragmentary section of the sheet material of Fig. 18 in a folded construction for embodiment in frame construction as in Fig. 16 and other figures.

Fig. 20 is a fragmentary sectional view of another arrangement of materials in folded formation similar to Fig. 19 and for similar use.

Fig. 21 is a diagrammatical fragmentary longitudinal sectional view of wrapped lamination for frame construction of graduating dimension.

Fig. 22 is a digrammatical fragmentary longitudinal sectional view of an alternate wrapped construction for use similar to that of Fig. 21.

Fig. 23 is a diagrammatical fragmentary sectional view showing another method of wrapping laminations for frame construction similar to Fig. 17 and including features of Fig. 20.

Fig. 24 is a fragmentary side elevation of a wrapped lamination as finally prepared in an indenting or crimping apparatus.

Fig. 25 is a fragmentary side elevation of a lamination showing another method of wrapping for frame construction of graduating dimension and alternative to that of Figs. 21 and 22.

Figs. 26 and 27 are somewhat diagrammatical cross sectional views of another form of the frame construction before and after molding.

Fig. 28 is a fragmentary cross section showing a modified form of the structure of Fig. 27.

Figs. 29 and 30 are somewhat diagrammatical sectional views of the laminated frame construction employing the wrapped laminations similar to Figs. 17 and 23, etc., before and after molding.

Fig. 31 is a diagrammatical sectional view of an alternate wrapped lamination for use in frame construction similar to Figs. 29, 32, etc.

Figs. 32 and 33 are somewhat diagrammatical sectional views of another form of the frame construction of rounded cross section showing the wrapped lamination before and after molding and the molding form.

Fig. 33a is a somewhat diagrammatical sectional view of another form of the laminated molded frame of rounded cross section and formed after the manner of Fig. 33.

Fig. 34 and Fig. 35 are a somewhat diagrammatical cross sectional view and a cross sectional and fragmentary perspective view, respectively, of another form of the laminated frame of rounded cross section before and after molding and the mold shown fragmentarily in dotted lines.

Figs. 36 and 37 are a somewhat diagrammatical fragmentary cross sectional view and a cross sectional and fragmentary perspective view, respectively, showing another form of the frame before and after molding with the stringing holes formed coincidentally with the molding of the frame and fragmental portions of the mold and hole forming means.

Figs. 38 and 39 are plan views of the forming platens with portions broken away showing the molding set-up for forming the frames.

Fig. 40 is a cross section of a specially formed pressure and molding tube for use in the pressing of the frame laminations and plastic material.

Fig. 41 is a front elevation of a modified racket frame particularly suitable for light badminton rackets.

Fig. 42 is a fragmentary front elevation of another modified racket frame also suited to badminton as well as tennis, etc.

Figs. 43, 44 and 45 are cross sectional views of the frames of Figs. 41 and 42, taken on lines 43—43, 44—44 and 45—45, respectively of Figs. 41 and 42.

Fig. 46 is a cross sectional view of the racket shank taken on line 46—46 of Fig. 42.

Fig. 47 is a cross sectional view of the racket shank taken on line 47—47 of Fig. 41.

Fig. 48 is a plan view of the spring bridge member of the frame of Fig. 41.

Figs. 49 to 62 inclusive are fragmentary front elevations and sectional views of modified forms of the spring bridge and frame construction; Fig. 53 being a fragmentary plan view of the bridge of Fig. 52 and Figs. 55, 57, 59, 60 and 62 being sectional views taken on lines 55—55, 57—57, 59—59, 60—60 and 62—62 of Figs. 54, 56, 58, 58 and 61 respectively.

Fig. 63 is a fragmentary front elevation of one form of the racket with top and bottom turnbuckle construction in combination with the spring throat.

Fig. 63a is a fragmentary front elevation of one form of prong or bonding tooth formed along the metal frame members constituting facings or reinforcements of the frames.

Fig. 63b is a fragmentary perspective view of a modified form of the prong similar to Fig. 63a.

Fig. 63c is a fragmentary front elevation of a modified form of turnbuckle connection to the racket frame ends.

Figs. 64, 65 and 66 are fragmentary front elevations showing modified forms of frame tops.

Fig. 67 is a front elevation of a modified form of the racket frame.

Fig. 68 is a fragmentary front elevation of a solid throat in lieu of the open throat of Fig. 67.

Figs. 69 to 72 are fragmentary front elevations of modified forms of the racket head.

Figs. 73 and 74 are cross sectional views of modified forms of wrapped laminations for forming frames.

Figs. 75 and 76 are fragmentary cross sectional views showing the forming of a laminated frame molded with laminations similar to that of Fig. 73.

Fig. 77 is a fragmentary cross sectional view similar to Fig. 76 showing the forming of a frame including laminations similar to those of Figs. 73—74.

Figs. 78 and 79 are fragmentary cross sectional views of laminated shells, together with means for molding and integrating same, from which a plurality of laminated racket frames can be cut and shaped to any of the various cross sections indicated therein.

Fig. 80 is a fragmentary perspective view showing such a laminated shell of the type of Figs. 78 and 79 being integrated and pressure molded on a forming core under fluid pressure.

Fig. 81 is a fragmentary perspective view showing somewhat diagrammatically another positioning of a laminated shell as in Fig. 78 or 79 for integrating and pressure molding.

Referring in detail to the drawings, Figures 1 and 2 represent a racket having a frame 1 of unique shape and laminated spring construction and having an adjustable turnbuckle 2 at its outer end and a spring bridge and throat reinforcement 3 at the throat of the racket head. The stringing 4 is uniquely arranged to work with these expanding elements 2 and 3 so as to make the strings react with said elements and the frame to produce a tautness and resilience not heretofore obtained. The frame 1 also is uniquely shaped for the same purpose and to provide against customary distortions, the head being formed with a sharp turn-in adjacent to the throat producing a broad playing area in the lower portion of the head with strongly and pronounced arching sides converging to a narrowed head extremity of a flattened or more squarish shape than that of the customary more pointed curving wooden racket head and uniquely dipping or bowing inward at the central extremity forming an inturned arch. This frame contour is still more clearly accentuated in the racket frame of Figure 3 and subsequent figures and produces novel frame reactions, etc., as will be further pointed out.

The design, size, shape, etc., of the spring bridge and reinforcement member 3 can be greatly varied, some of the various forms also being indicated in subsequent figures. In general, the central group of longitudinal strings are anchored in the spring bridge so as to move with same and the number of these strings so anchored will be determined by the design of 3, that of Figure 1 securing the central eight longitudinal strings while that of Figure 3 holds four. This can be varied at will. It will be noted that by virtue of the adjustable turnbuckle 2 and/or the spring bridge 3 the enclosed stringing area of the racket head can be changed at will and the shape of the racket head modified. These features can be utilized to advantage in many ways and particularly in the method of stringing the frame. This latter can be greatly varied for different effects but in order to secure maximum tautness, which is so eagerly sought in the modern goal of speed, I preferably contract the open spring throat from its normal position so that the head frame is pressed inward from the position indicated approximately by the fragmentary dotted lines A—B. This is effected by any suitable clamping means and indicated diagrammatically by the adjustable jaws 5 and 6 (shown in dotted lines). This contraction of the throat tends to elongate the head, forcing the frame outward at its extremity. I preferably, in this instance, provide against this elongation by means of suitable clamp or holding means indicated by the adjustable jaw 7 (in dotted lines) which can be first set and locked to hold the end of the frame in fixed and desired position prior to the throat contraction for the stringing operation, and contract same inward as from the normal position indicated by dotted line C—C. When the throat is contracted it will be noted that the spring bridge 3 changes its position, the string support portion 3a moving upward from the normal position diagrammatically indicated by the dotted lines 3b, this being accomplished by the secondary spring ring 3c changing its shape under contraction from the normal position diagrammatically indicated by the fragmentary dotted lines 3d so as to force the central portion of 3a upward while the contraction of the throat with the reinforcing side members 3e of the bridge piece likewise forces the ends of 3a upward at the spring actuating points 3f so that the string anchorage 3a tends to advance upward as a whole.

With this position of the head, the longitudinal stringing is now woven in and pulled up taut, the turnbuckle 2, it being understood, being in contracted position so that the oppositely threaded ends (2b—Fig. 5) of the opposing sides of the frame are drawn together, this being accomplished by turning the threaded joining sleeve 2a with a suitable wrench anchoring in the holes 2c or in any other desirable way. After the longitudinal strings are drawn taut, I then release the holding jaw 7 and permit the frame to exert its elongating pressure against these strings to still further tighten them and I then weave in the transverse stringing in taut position; or if still greater longitudinal string tension is desired, I first contract the sides of the head frame by contracting adjustable opposing clamp jaws 8 and 9 indicated diagrammatically in dotted lines so as to exert still further frame elongation stress against the tight longitudinal stringing. After the cross stringing is completed, the clamp jaws are released, permitting the frame throughout to expand or exert its expanding force against the stringing with which it comes into equilibrium. In this connection, it will be understood that the strength of the throat piece 3 and the frame in its clamped-in position is such that the frame tends to expand against the taut cross-stringing when the clamping is withdrawn, and not to collapse. The racket, by virtue of the several stringing and clamping steps described and its unique construction has now supertight stringing although the further tightening opportunities offered by the expandable turnbuckle 2 have not as yet been resorted to. This is reserved for two purposes, i. e., adding even still greater string tautness in play when the ultimate in speed is demanded and further, to take up at will any slackness developing in the stringing as aging and play bring about the inevitable stretching in racket stringing. Still a third purpose can also be served by slightly expanding the turnbuckle prior to stringing the racket. In this way the turnbuckle can subsequently be contracted when the racket is not in play so as to take the high tension off the stringing, thereby preserving it, and preventing breaking from change in moisture, temperature and climatic conditions which so often causes the stringing, particularly in wood frames, to snap while at rest. When the racket is put in play the turnbuckle is then expanded to produce the desired degree of string tautness.

In Figure 1, a unique method of stringing the longitudinal strings in their disposition at the outer end of the racket head is shown, particularly designed to enhance in large degree the tightening effect on the central groups of these strings when expanding the turnbuckle 2. In this instance, this arrangement is applied to the ten central longitudinal strings. Instead of these strings being woven in direct alignment into the head of the frame in the customary manner (similar to those of Figure 3), the strings of each adjacent pair are spread in opposite directions from the upper cross string and in crossed position so that the strings of each such pair diverge and pass through or anchor in the frame on opposite sides of the adjustable turnbuckle. With this novel arrangement, the spreading of the frame of the racket head by means of the turnbuckle directly tightens not only the cross or transverse stringing but likewise, at the same time, these several paired groups of longitudinal strings by increasing the spread between their opposing frame anchorages.

Considering in further detail various parts of the racket, it should first be noted that the frame is of a novel laminated construction particularly designed to augment and work with the spring action of the spring bridge and throat by giving the frame itself a further supplementing and unique spring action and particularly by combining with my unique multi-tube-like construction, or even with ordinary laminated wood construction, metal spring elements integrally bonded with same by new modern plastics and/or adhesive means as well as mechanical interlock. In Figure 1, the racket frame 1 is preferably formed in two opposing right and left halves subsequently joined on the longitudinal axis of the racket by the turnbuckle sleeve 2a at one end and by the spring throat and bridge piece 3 and a bonded central joint 1a along the shank or handle portion at the other end. The frame of Figure 1 can be that of any of the various modified forms shown in the various figures. As indicated in cross section in Figure 4, it can be formed with a plurality of spaced apart and preferably unconnected longitudinal light tensile spring members 10, 11 and 12, and preferably metal, which are integrally united with interposed non-metallic laminations, formed in this instance of light-weight tube-like members, the unique formation of which produces not only great strength with little weight but also still further spring reactions within themselves. The metallic members, 10, 11 and 12, can be formed of light-weight highly resilient strip metal having high tensile strength and fatigue resistance. While aluminum or magnesium or their alloys may be used, I preferably employ for these, steel alloy, heat-treated for high tensile strength and drawn to the desired temper for the best spring action. Steel alloys of chrome and nickle and/or molybdenum and/or vanadium preferably giving a stainless high lustre finish, are preferred to produce an unusual and highly attractive appearing racket in combining these members with the interposed non-metallic laminations, etc. In order to reduce the weight to a minimum and keep within the narrow weight limitations permissible in modern rackets and also to provide interlocking bonds with the non-metallic contiguous laminations, the metal strips are slotted out throughout all or the greater part of their length so as to leave their outer edges continuous and connected with the spaced apart cross connections so formed. Where the greater stresses are to be met and/or greater weight for balance is desired—as in the lower portion of the head and in the handle—the amount of slotted out metal can be reduced or eliminated entirely in such areas. The outer edges of the metal strips are preferably turned in or folded back, with or without additional reinforcement (as 10a—Fig. 11 and 12a—Fig. 12), so as to produce a rounded non-cutting outer edge as well as to secure a greater mass of metal strategically located at the outer portions of the frame cross section and thereby produce a maximum stress resistance as well as spring action. Directly within and extending longitudinally with the outer metal longitudinals 10 and 12 of Figure 4 are the tube-like non-metallic members 13, 14, 15 and 16. These are novelly formed by wrapping longitudinal strips of balsa wood or equivalent low specific gravity material 13a, 14a, 15a and 16a and b with plastic impregnated or treated paper 13′ (Figs. 17–19) in its preparatory or unpolymerized state preferably of the type known as "papreg" recently developed by the U. S. Forest Products Laboratory and having a strength approximating that of aluminum after being polymerized under heat and pressure. For greater tensile strength and resistance to shock impact, I also, when desired, combine these sheets with fibrous reinforcement as will be later noted. The wrapping is applied to the balsa core members in either sheet or strip form to the desired and varying number of thicknesses according to location and desired stress resistance and may be either in strip form wound helically as in convolute tubes, or a simple sheet wrapping as in parallel wound tubes. The core members of balsa wood are preferably coated or impregnated with the plastic and at the proper incompleted cure stage for the subsequent proper hardening and molding process to which the assembled frame laminations are finally subjected. The balsa core, having a specific gravity of only .2 or less, serves only as a semi-structural material and in portions more heavily stressed, as in the lower head and throat area, can be augmented or replaced by strips of ash or other good structural wood or even thin metal or other suitable tensile material or combinations thereof. These cores can be in single or multiple laminations and, being unattached to each other or somewhat loosely disposd when in multiple, are able to slide upon each other in being bent around the highly curved form of the racket frame while in the flat. The laminations, where in single strips of a thickness requiring it, may also be cross scored or scarfed on either side at the proper locations and on the proper sides to better conform to more accentuated curves and can also be scored lengthwise when necessary or desirable for the changing of the cross-sectional shape from flat to curved in the final form pressing, as will be later brought out. The thickness of the core is likewise changed at will, as in the thickening of the frame in the lower portion of the head, by increasing the number of plies or the thickness of laminations within the paper wrapping at such points, and/or inserting additional wrapped laminations. It is preferred that the core elements should be dried to a low moisture content for the plastic pressure treatment in the forms so that thereafter the cores, in absorbing moisture in equalizing with the atmosphere will tend to expand against the "papreg" tube walls to form a higher resistance core cushion against same, and produce a greater spring reaction in the tube elements. Interposed between the plastic paper tube members 14 and 15, is the slotted spring metal strip 11 (Fig. 4).

It will be understood that the number and thickness as well as the relationship of the laminations can be greatly varied without departing from the invention and similarly the selection and arrangement of materials can be greatly modified. Some of these various modifications will be subsequently described.

When desired, any or all of the metal strips 10, 11 and 12 may be combined with reinforcing wires having especially high spring action. When used, these can be of any desired cross section, size and shape and preferably have the metal edges of the accompanying strips turned wholly or partially about them (as 10a and 12a in Figure 11) and can also be united therewith by metal brazing, if wanted. One of the particular features of this arrangement is that these spring wire elements can be formed of different metal or alloy from that of the metal strips so as to add thereby special and additional physical properties including a different temper and/or heat treatment. In this way, it is possible to impart a maximum or desired tempered spring action to these covered and invisible members independent of other and possibly different qualities desired in the externally exposed strips 10 and 12 which can be independently heat-treated prior to being combined with these ultraresilient spring members.

Referring to further details of the construction of the frame 1, at the lower portion of the head where the hitting stresses gradually increase in approaching the throat and where most of the breakage and shattering of racket frames are found to occur, my frame cross section is preferably enlarged in the width of its face (as well as thickness), as indicated, and in graduated manner by increasing the size and/or number of the laminations. Also, when wanted, both for strength as well as ornamentation and unique and pleasing appearance, I add thin wood veneer, "papreg," or other suitable tensile exterior windings or covering 17, as indicated (Figure 4), preferably in stepped-up thickness or number of the laminations, as same approaches the throat and base thereof from the more central portion of the head. This reinforcement 17 is preferably wrapped around the longitudinal laminations, preferably not including the outer metal members 10 and 12 (as indicated in Figures 1 and 4), after they are bundled together in the preparatory form assemblage, and leaving the metal members 10 and 12 exposed to view. To give greater whip when desired at the base of the throat, the thickness or number of the laminated longitudinal members can be gradually reduced from the portion of the throat higher up, as indicated in Figure 1, and similarly the wrapping 17 can be stepped down in thickness. In the upper half of the frame where the stresses reduce, this wrapping 17 can be omitted but added again at the extremity for additional strengthening at that point as well as for ornamentation, as shown in Figure 1. However, in simpler and cheaper forms, the wrapping 17 can be omitted from the frame throughout.

The shape of the frame 1 in cross section can be any of various forms and also preferably changes form and size at different points of the racket as indicated. Preferably, however, it is either bevelled or rounded in cross section as distinct from rectangular, the shape having an important relationship to the novel method of plastic pressure forming to secure a maximum molded strength in the "papreg" and plastic bonded or impregnated wood members, which I employ in certain instances. The frame is also preferably provided with a longitudinal stringing groove 20 throughout part or preferably all of its length. This serves a dual purpose, providing the necessary sinkage for protection of the strings against abrasion by ground strokes on the outer portions of the head and at the same time providing a special feature in the pressure forming method to enhance the plastic strength of the molded sides of the structure in conjunction with the bevelled or curved shape of the receiving form. In the assemblage and molding of the frame, the various laminated elements are first placed in the molding form in their proper relationship. The "papreg" or plastic treated sheet wrapped cores of wood or other strips being in the flat and of relatively thin pliable thickness and being able to slide loosely on one another in bending, can be readily conformed approximately to the changing curves of the racket or racket molding form. The latter provides a shaped slot 21a (Figure 4) formed by opposing grooves in the platens 21 and 22 which lock together to enclose the laminated elements after their loose assemblage in the slot-form 21a therein along the outer perimeter within the form so provided lies a suitably pliable fluid pressure and hose-like tube 23 with operative connections at the opposing extremities of the racket frame (as further illustrated in Figures 38 and 39). Between the pressure tube 23 and the laminated frame elements is placed, in this instance, a forming strip 24 of metal, thermoset plastic or other suitable material which has been shaped or molded to shape or mold the outer edge of the subsequently molded racket and so forms a movable bearing face for the pressure tube 23 when it is expanded from its collapsed (dotted line) position by internal fluid pressure to compress, mold and plastically integrate the confined laminations to form the hardened racket. When preferred, however, this form member 24 may be omitted and the metal strip 10, as in Figure 11, so designed and shaped as to serve at one and the same time as both the forming element and the outer reinforcement of the frame. In such case, the pressure tube 23 presses directly on the formed metal strip 10 to which the pliable frame laminations themselves. The mold platens are also provided with the proper venting holes as 24b at suitably located points for adequate discharge of the air from within the closed form as the pressure is applied in the tube 23. After the opposing platens are closed together in locked position, the necessary fluid at the proper polymerizing or hardening temperature and pressure for the plastics or other adhesives employed as the bonding agents of the laminated and associated elements, is introduced and circulated through the pressure tube 23 which is designed to expand accordingly within the enclosed form and force the laminated members down into the wedge shaped form, slot 21a, where they are compressed to the proper shape and hardness by the heat and pressure to which they are thus subjected, while the air in the form is vented or removed through spaced apart vent holes 24b and any others as desired. The fluid within the tube 23 supplies the heat for the plastic molding and this can be augmented if found necessary by steam heating cells as 24a in Figure 4 or alternatively high resistance electric heating can be employed when the frame and mold are designed with such end in view. In this connection the metal elements 10, 11 and 12 or any one of them can be utilized in dual capacity for electric heating elements or conductors as well as frame reinforcements.

It should be especially noted that, owing to the frame cross section being wedge shaped, the flat laminations as they are forced inward by the pressure of tube 23 on the movable form member 24 (of Fig. 4) or the shaped metal member (as 10 of Fig. 11) have their outer edges turned backward by the narrowing wedge form to approximate U-like formations and these are accentuated by the pressure from the forming of the groove 20 on the outer perimeter of the frame by a shaping form band 24. In this forming process, the fluid pressure is applied on the outer metal strip 10 which can also serve, when so wanted as in Figure 11 as already particularly noted, both as an integral part of the molded and finished frame and likewise as a forming element as well (and in such case eliminating the movable perimeter form member 24 provided of metal, plastic or equivalent as in Fig. 4). As a result of this and the wedge shape of the form, the fluid pressure is brought to bear not only normal to the top and bottom surfaces of the laminations but also positively against the diagonally disposed sides—a condition which would not similarly occur if these sides, instead, were parallel to the line of applied pressure. The projecting groove form as 20 of 24 (or alternatively metal member 10 in Fig. 11) further radiates this pressure in an arc and greatly increases the pressure sidewise in forcing and compressing the excess material inward. This results, among other things, in the tube-like "papreg" elements 13, etc., being given direct forming pressure on all sides. This is important in-so-much-as the pressure so applied determines the strength of the plastic molded material. With "papreg," physical properties such as tensile strength, approaching or equivalent to those of aluminum can be developed with forming pressures as low as 25 pounds per square inch and either such or the highest desired pressures can be employed in molding my frames, the platens, of course, being properly constructed for the pressures contemplated. In this connection it is also possible to produce strengths approaching those of steel in the wood laminations such as those in Figure 11, etc., or wood cores in the "papreg" tubes, (when the stronger woods are substituted for balsa), by pressing these with the methods employed in forming what is technically known as "impreg" and "compreg" plastic treated wood or by other chemical treatment of the wood. In such case of "impreg" and "compreg," the wood laminations have their cellular structures impregnated throughout with the plastic by special methods and the forming pressure is raised to 1500 pounds or more per square inch with the resulting physical properties above noted. All this has to do with the all important size of the frame cross sections required for the necessary stress resistance. By these methods and my novel design, I am able to reduce the frame cross sections to a minimum with a resultant reduction in air resistance, increased lightness and accordingly a faster playing racket.

Referring further to the spring throat and bridge element 3, this can be integrated with the frame in the molding of the latter by placing the pre-fabricated bridge element in the form, properly built to hold same in the correct position, preliminary to the pressing process, but in the case of Figure 1 when the frame is made in two halves, the member 3 can be subsequently positioned and joined with the frame at the time of or following the joining of the two separately formed halves. In this instance, the inner metal member 12, when being first formed by stamping, has wing or lug portions 25 partially slotted out and bent outward to register in receiving holes in the side members of 3. When 3 is in place in the throat these engaging wing portions are then bent over and clinch the spring member 3 in place as indicated, so resisting the upward pull of the stringing on same. Before this is done, the opposed surfaces of the metal members 12 and 3 are coated with special adhesive 26 for joining same under pressure. For this I prefer a new adhesive known to the trade as "Cycleweld" which under heat and pressure treatment similar to that applied for the other plastic molding produces a metal to metal union equivalent to riveting or other equivalent connection means. Any of various other metal adhesives or plastics now being rapidly developed and adequate for the same purposes may likewise be used. In frames where the spring bridge is joined with the frame at the time of forming the frame, this Cycle-weld treatment is provided by the molding pressure and heat applied to the whole frame in plastically joining and shaping the laminations, etc. In addition to the adhesive 26 and the clinching prongs or lugs 25, the bridge element 3 is also preferably anchored at the base of the throat or in the handle shank by a pin 27 or other equivalent holding members or extending arms and at this point I also preferably embrace the shank or throat frame members with a holding ring or band 28 which is formed of the chrome finished metal or other suitable material. This ring 28 serves as a holding member against the spreading apart of the throat shanks or sides in the expansion of the bridge and throat as well as a holding seat for the pin 27. The opposed frame members meet and join at about this point and are permanently joined and held together by plastic or other adhesive along joint 1a to provide the shank and handle portion of the racket.

The handle, itself, is wrapped with the customary leather grip 29 and the shank and handle can be built out to any desired size and cross sections with additional plies or wood fillers 30 adhesively joined with the frame members in their forming or when the two frame halves are united. The shank portion I preferably round as indicated in Figure 8 and gradually taper to the grip portion which can be of any desired shape but which I preferably slightly groove out on the four sides along the handle length as indicated in Figure 9. This provides a better hold for the fingers and hand and the leather or other covering material 29 which is wound about the handle is conformed to and held in place when glued to the handle by vertical insert strips 31 which wedge the covering material 29 into the receiving slots 31a formed in the sides of the handle for this purpose. These vertical or longitudinal holding strips 31 serve not only in this capacity but also subsequently prevent the covering, which is customarily wound spirally as indicated, from being pushed out of position or the edge joinings opened up by the finger gripping and at the same time present a highly ornamental and distincitive handle design different from those in use at the present time, and one in which various color effects can be readily introduced by using different contrasting colors for the strips 31 and the grip winding 29. They can also serve at the same time for carrying, properly inscribed thereon, the name of the racket or any other labelling. In joining the opposed shank portions of the frame, I add, when wanted, an insert member (not shown) of wood between same at 1a, and visibly terminate the metal members 12 at the ring 28, tapering them off to final and concealed termination and extending and terminating the ends of 3, as at 12b, to graduate the strain resistance thereby. For the same purpose of graduating strain resistance to prevent snapping tendencies, I also preferably include upper tapered wings 28a on the sides of the ring member 28, as shown in Figure 2, which also are "cycle-welded" at 26 to the metal members 10 in the pressure joining.

The turnbuckle 2 can be formed in a variety of ways for joining with and securely holding to the ends of the frame members under the sever playing and expansion stresses to which the frame is subjected. Steel alloy or aluminum or magnesium or their alloys or other suitable material can be used for this member but I prefer the lightest metals such as the above mentioned for this purpose. The opposed and oppositely threaded ends 2b which operate in the threaded sleeve 2a are securely held in place by having the extending metal members as 10, 11, and 12, or any of these together with others of the frame laminations, serve as anchorages bonded within 2b (Fig. 5). In such case, the balsa or other core members of the tubular elements 13, 14, 15 and 16 can be reduced in size or omitted at the point entering the restricting ring 2b as indicated in Figure 5, sufficient material being left, of course, to fill and firmly bond and hold the turnbuckle in place. Alternatively, the connection can be made by providing anchoring tongue extensions (as in Figure 63), bonding between laminations of the frame or the connection can be made in a variety of securely interlocking unions made either simultaneously with the molding of the frame or subsequent thereto.

In Figure 5 the three metal members 10, 11 and 12 form narrowed tongues which along with the non-metallic laminations form a receiving end for 2b and are formed and molded to provide an annular rabbet, sloped and undercut to hold the ring 2b securely in position and prevent its coming off due to the beveled formation of the ring-enclosed laminations. The ring 2b in the case of aluminum, etc., can be extruded or compressed on this and with an interior film of "cycle-weld" cement or equivalent and so bonded under the proper pressure and heating. Or, instead, as further indicated in Figures 6 and 7, the ring 2b can be molded in place coincidently with the frame forming. In this latter case, the ring 2b is formed in two halves and preferably with extending wings 2ba, the two halves being secured before the molding on the extending metal tongues 10 and 12 to which they can be joined by "cycle-welding," brazing, soldering or riveting, as the case may be, or can even be formed integral with same if so wanted. Figure 7 indicates the opposed half rings (to form 2b) and laminations (as 13, 14, 15 and 16) in position in the pressure form before forming and Figure 6 shows same after the forming which, in this case, is brought about by the expansion of the fluid pressure tube 23 although the forming and molding can likewise be accomplished by mechanically operated platens or hydraulic presses, etc. As the half ring sections are forced together, the extending wings 2ba are forced inwardly about the laminations which they previously serve to hold in position and are bent into final and contacting position as shown in Figure 6. In the case of Figures 5, 6, and 7, the threading of the ends 2b for receiving the sleeve 2a is preferably done after the rings are in place on the frame ends but in other cases this screw threading can be done prior thereto in fabricating the ring in a single piece and joining same with the frame and either after or in the process of the frame molding or gluing and pressing.

In Figure 3 the frame 1 has the turnbuckle 2 omitted but the top end of the frame is still novelly bowed in slight degree, similarly to Figure 1. To accentuate resistance to the common weakness and tendency of racket frames, under the heavy pressure of the cross stringing, to point outward and so become elongated (and narrowed) and to strengthen the resilient bow action of this unique frame end, the cross section at the top end of the frame is preferably slightly enlarged, as indicated, and then tapered down to the narrowest frame section at points 32 (to act as a hinge point in contraction, etc.), from which points it graduates to a larger cross section adjacent to the throat and tapers again slightly to a narrower cross section at the shank embracing ring 28. The sharply arched frame shape gives a large playing area while maintaining a small racket head and in the contraction and expansion of the frame in stringing and play, as already described, provides, because of its shape, strongly arched sides which tend to hinge, in expanding, on the thinnest frame points 32, thus thrusting the end of the racket head outward as a whole when the throat is contracted. At the same time, the slightly bowed-in central point of this outer end springs slightly inward, as indicated by the dotted line D, as the ball strikes on the central longitudinal strings, and then resiliently springs outward again, whipping the ball return with increased speed as the longitudinal strings are so instantaneously tightened and actuated like bow strings. The same action is likewise occurring simultaneously at the other and lower end of the longitudinal strings where the spring throat anchorage 3 with similar bow action, moves upward in the head as the throat is contracted by the ball pressure on the transverse stringing and the spring bridge pulled upwardly the ball pressure on the longitudinal strings, all of which is followed instantaneously by the opposite reaction of the bridge and frame, causing both the longitudinal and transverse strings to tauten and whip the ball with unprecedented speed and shoot it like an arrow from a bow string where the resiliency of the string and the bow participate to a maximum degree. It should be especially noted that this bowing in of the upper frame end on the central longitudinal axis tends to transfer the main elongating strain set up by the transverse stringing from the centermost longitudinal strings to those on either side thereof which anchor in the arches formed in the frame on either side of the central indentation therein. This relieves the over-played and customarily over-strained central longitudinal strings accordingly in addition to introducing the whip action already noted.

The resiliency of the frame in Figure 3 is also accentuated by including with the slotted out metal spring members 10 and 12 the special spring wires 10a and 12a held in the turned edges of same as shown in Figure 11. The ends of wire 12a meet and terminate in abutment at the indented center of the outer end of the frame but the wire 10a extends continuously around the frame head and down the throat shanks to the ring 28, terminating there or at any point below, wherever desired. At the throat the strip metal member 12 passes down and is joined to the side members of the throat piece 3 on the opposed inner sides of the open throat so formed while the spring wires 12a span the top of the throat and are compressed downward as indicated by dotted lines 12ab when the throat is contracted (as toward dotted lines A—B) in the stringing clamping already described or in the ball action on the strings in play and then spring upward into position again to spread the frame and strings in quick reaction. In conjunction with this action the spring bridge piece 3, which spans the throat in between the opposing wires 12a, expands upward (towards dotted lines 3') as the throat contracts and then resiliently springs back into normal position, with the longitudinal string reaction already described. By novelly indenting this bridge span 3 which is preferably formed of strip steel alloy with maximum and properly tempered spring action, I prevent this from simply pointing upward at the center in bending with the throat contraction and instead distribute the bending action to the extreme ends 3f of the bridge where it curves downward, and to the intervening arches formed, with the result that the bridge piece tends to move outward as a whole and impart to all the bridge-anchored longitudinal strings a greater upward and downward movement rather than to just the very central ones. The number of longitudinal strings passing through or anchoring in the bridge piece 3 can be varied by designing the size of same accordingly. In Figure 3, the four central strings are so secured. With a larger and similarly shaped spring bridge six or more central strings can be so anchored. The design of the spring bridge piece can be greatly varied as will be subsequently indicated in part. In anchoring in the metal bridge span, the strings are cushioned and protected from metal abrasion by the under bearing strip 3g of suitable material such as resilient plastic fibre or the like which can be formed with projecting bosses 3h, as seen in Figures 12 and 13, which fit into larger holes in the metal support so as to maintain the strings passing through same away from the metal edges of these stringing holes 4a. Further, if desired, the under side of the non-metallic bearing strip 3g can be provided with a thin leather or equivalent face to provide still softer string bearing 3i which helps preserve the life of these central strings which in all rackets receive the brunt of the play and wear. This softer face 3i is particularly feasible in my spring throat construction as the spring expansion takes up any give or loosening which the face may give the strings in the course of time.

The frame of Figure 3 shows a modified form in which the central slotted metal member 11 is omitted except at the points noted adjacent the throat where they are inserted in the lamination to provide extra strength at this heavily strained point and greater spring action for accentuating the spring reaction of the open and moving throat sides and bridge span. The frame in cross section can have various lamination combinations but as indicated in Figure 11 is provided in this instance with plastic impregnated paper wrapped balsa core laminations 13 and 16 in contact with the outer metal members 10 and 12 respectively so that, as in the frame of Figure 1, the plastic paper presses up into the slots 37 in the metal members in the molding to form non-metallic string bearings 3h and also interlock and bond with the perforated metal strips. Between these members 13 and 16, are the desired number of wood laminations, in this case four, i. e., 33, 34, 35, and 36. These laminations are in association with plastic, in any desirable form as, impregnation, coating, etc., or bonding films, and may be all of structural wood such as ash or, instead, of alternating structural wood and intervening semi-structural and cushioning material of light weight, such as balsa wood, which both reduces the specific gravity of the frame to compensate for the additional weight caused by the metal members and likewise serves as a vibration absorber and a springy cushioning member. This construction can be greatly varied for any of the racket frames as will be further indicated in subsequent alternative frame cross sections. The laminations, relatively thin, are placed loosely in the form 21a in "the flat" and easily conform themselves under pressure to the curves of the racket head as they slide loosely on one another before the final pressure hardening. Because of this it is possible to make sharper and stronger reacting curves in the frame than in other frames employing bent wood or thicker laminations which my thinner, stronger frame does not require. A particularly unique feature of my frame is then brought about in the molding as indicated in Figure 4 when the fluid pressure is applied to expand the pressure tube 23. In Figure 11 this is brought to bear directly on the metal member 10 which by virtue of the groove 20 presses the other laminations from flat strips into curved U-shaped members of much greater structural depth with correspondingly great increase in strength and rigidity and proper spring reaction in the arched frame. Where the curves extending longitudinally of the frame are very sharp and the forced transverse curving of the wood laminations is sufficiently deep or pronounced, folds or wrinkles may tend to occur at points along the compressed edges. In such extreme cases better conformation may be provided for by properly disposed and spaced edge slits or notches of such laminations before assemblage to secure a lapping or dart effect at these deeply curved and compressed points and these will be smoothly compressed together under the severe molding pressure in the form.

In Figure 3 the spring bridge and throat member 3 is arranged to be combined with the frame simultaneously with the molding of the frame although it can be combined with the same later if desired. It will be understood that all the metal members 10, 11, and 12 are slotted out along their length after the manner indicated in diagrammatic Figures 12, 12a and 12b, the length of the slot openings, as 37, 38, and 39, or the width of the intervening metal spanning sections 40 being varied at different points of the members to conform to changing stress and spring reactions desired — various types being shown in Figures 12, 12a, 12b and 13. In this slotting of the metal members which is done in the stamping or shaping of the strip metal, the metal is so cut as to provide at desired anchor points, sharp projecting points 41 which are bent outward at right angles to the face of the strip from the dotted line positions indicated in Figure 12 in the stamping and forming of the slots. The stringing holes 4a are located within these slotted portions spaced away from the edges of the metal holes and protected by the plastic paper or non-metallic material projecting into the metal openings, 37, etc. At the same time I preferably locate my projecting metal points 41 opposite or adjacent these stringing holes so as to provide compensating strength at these points to the frame which is weakened by the stringing holes. The projecting points 41 thus serve a dual purpose, the second of which is to press into the contacting lamination and longitudinally with the grain so as to firmly integrate the metal and non-metallic members over and above the adhesive integration resulting from the adhesive and pressure treatment, etc. By positioning these bonding points 41 longitudinally of the wood grain of the laminated frame the grain is not severed crosswise to any extent but instead merely pushed aside by the piercing points and thus the fullest tensile strength of the laminations is preserved. When and where desired, however, the points 41 can be omitted by completely slotting out the metal, thereby further reducing the weight, in which case the bond with the other frame laminations is carried entirely by the bonding adhesive with which the metal contacting surface is coated, together with material projecting into the slots and coupled with the pressure of the laminations together due to the contraction of the spring frame in the clamping process and the inward pull of the taut stringing. This same construction with projecting points 41a is present in the throat sides of the metal strips of 3 as indicated in Figures 3 and 14, the strip metal of same being slotted out with the projecting points 41a extending into and firmly anchoring the bridge piece to the frame 1. In molding assemblage, the bridge piece 3 (as in Figure 3), with proper interior temporary block support, is positioned in the molding platens designed to hold same in the molding process. The surfaces contacting the sides of the throat frame are preferably coated with "cycle-weld" 26 or other suitable bonding adhesive and the points 41a pierce the frame and bond with same when the molding pressure is applied through the pressure tube 23. Additional anchorage is provided at the base of the bridge piece, where the ends of the metal strip forming same terminate in the shank of the racket (in tapered or pointed form 12b as in Figure 2), by turned out points or a metal insert 27a passing through same which can be interiorly embedded within the frame members as shown in Figure 3 or extend through same to anchor in the holding ring 28 after the manner of the pin 27 in Figures 1 and 2. In Figure 3 the outer metal member 10, circumventing the exterior of the frame in one piece, can terminate with similar suitable pointing adjacent or within the ring 28 or may continue down the shank as shown. The inner metal member 12 extends around the interior of the frame in one piece from opposed points partially down the throat as shown. The edges embrace the reinforcing spring wires 12a (which can be of a different alloy, heat treatment and/or temper from 12) up to their parting point near the spring bridge span and the remaining ends of the strip 12 extend from there slightly downward to reinforce the upper portion of the framing of the open throat and overlap the corresponding portions of the bridge side members to which they are united by the proper bonding adhesive as "cycle-weld" 26, and the points 41a which pass through the holes provided in 12 for such purpose. When desired, of course, all the metal longitudinal members can be omitted and the metal bridge piece then anchors directly into the nonmetallic or wood sides of the open throat by means of the metal projecting points 41a or other suitable anchorage in addition to the bonding adhesive coating. When this throat is contracted for the stringing process or by ball impact on the stringing these spring wires 12a spring downward toward the position fragmentarily indicated by the dotted line 12b while the throat framing is contracted toward the dotted line position A—B and the string supporting bridge 3 is forced upward toward the dotted line position 3'. The reaction of these several spring elements in attempting to then regain their normal positions and equilibrium obviously develops the high speed resilient action of the stringing on the ball as already described.

In Figure 15 is shown a portion of a modified form of wood laminated frame with my indented head end and one method of forming the indent. In this instance the frame is formed of laminations of wood 42 interposed between tensile elements preferably formed of my impregnated paper formations 43, of which variations will be subsequently noted. The wood laminations are partially scarfed or scored at the point of indent as noted, preferably on the compression side, the scarf cuts 44a being tied together by the uncut tensile laminations 43 when the laminations are integrated under the plastic hardening pressure treatment to which they are subjected after assemblage.

In Figure 16 is shown a slightly modified form of the frame structure of Figure 4. In this case instead of the metal members 10, 11, and 12, being combined only with the plastically wrapped and formed tube members 13, 14, 15, and 16, as in Figure 4, the intermediate tubular members 14 and 15 are supplanted by unwrapped wood laminations 14b and 15b and between these and the central longitudinal metal member 11 are layers of "papreg" or plastic impregnated paper 14c and 15c which conform themselves to the turned edges and slotted out apertures of the strip metal member 11 (similar to 39 of strips 10 and 12) and closely bond with the adjacent wood and metal members, the metal member being provided with the proper adhesive coating for the purpose as may be found necessary. The upper and lower tubular "papreg" formed members 13 and 16 in this instance have a plurality of flat core strips 13a and 13b, and 16a and 16b and the same construction which is shown in the lower members 16 of Figure 4 and Figure 11 may likewise be followed in the upper member 13 of those figures. In this connection the outer core strip 13a or 16b is high strength structural material such as ash while the secondary core member 13b or 16a is of light weight balsa or other material of low specific gravity and only semi-structural or a filler. In the final pressure forming of the wrapped tube members as 13, 16, etc., of Figures 4, 11, 16, etc., the wrapping 13' is compressed in such manner as to form extending ridges or horns (as 13c of Figure 16) along the bottom or top outer corners or along the sides of these formed tubes to provide an exceedingly strong cross section of unusual shape and stress resistance. The wood laminations, when pressed into transversely curving cross sections, can be scarfed or grooved longitudinally at 44 to faciliate the forming. The intermediate laminations 14b and 15b may be of high strength ash or on the other hand of low weight balsa wood with the metal and other structural laminations and tubes in the latter case providing the main stress resistance and resilient spring action of my frame. The stringing holes 4a in my frame as in Figure 2 (and as in Figure 16) are preferably in alignment instead of being staggered as in the conventional wood frame where this staggering has apparently been found necessary to avoid splitting these more vulnerable frames. Because of my frames not being subject to such splitting weakness because of the nature of their construction, i. e., either the plastically formed multiple tube construction, the arrangement of grain, and particularly, when included, my metal reinforcing members, and other features brought out herein, they can so have the stringing holes in alignment and in my groove 20 as distinct from conventional wooden rackets, thereby doing away with the latters' weakness. This weakness develops from the necessity of slotting out the frame diagonally between holes located in the outer portion of the head to form a slot for the stringing to rest in, passing from one hole to another, and so be necessarily protected from the abrasion of ground strokes. These slots cut across the longitudinal tensile grain of the wood frame thereby greatly weakening same and on its tensed curved and bent portion (which is particularly vulnerable to "pointing out" distortion already emphasized). To make matters worse the slotting on the opposite sides of the central axis of the symmetrical head frame is different—on the one side the holes being entirely connected by a zigzag slot made necessary by conventional stringing layout and technique while on the opposite side the corresponding holes, by contrast, are only connected in pairs by disconnected slots instead of by a continuous zigzag slot. This latter, cutting across the tension side of the wood, weakens same more than the spaced apart cutting on the other side of the frame with the result that the frame is weaker on one side than the other and proceeds under tension and stress to warp out of shape and balance in favor of the weaker side. This weakness will be found present, it appears, in all wood frames and particularly as they age. My aligned holes in a grooved frame formed largely of wood avoid the above weaknesses of the wood frame. My stringing holes also may be either drilled as in Figure 16 and other figures, or, when preferred, molded in one operation as will be brought out in connection with Figures 36 and 37.

In Figures 17 to 33a are more fully illustrated, in somewhat diagrammatic form, the nature and arrangement of my laminated construction and of the "papreg" or plastically treated paper or/and film wrappings forming the core filled tubular members of the frames as 13, 14, 15, and 16 of Figures 4, 11, and 16, etc., as well as layers 14c and 15c of Figure 16 and various other details of the construction employed in forming my racket frames in these and modified forms. In Figure 17 is shown the wrapping 13' about a core composed of the two filler strips 13a and 13b which are relatively thin flat strips which, particularly in loose assemblage, bend readily to the curving form of the racket frame which on this account can be given much sharper curves than in thicker or ordinary wood construction and so produce stronger reacting arches. As already noted, "papreg," a special paper impregnated with plastic, i. e., thermosetting phenol-formaldehyde is my preferred wrapping material in the present stage of the plastic art, but any suitable paper or film or strong tensile sheet or strip material including even light metal foil in association with suitable plastic may also be used therefor. The "papreg" when subjected to the customary polymerizing pressure and heat produces tensile strength about the same as aluminum and at as low pressures as 25 pounds to the square inch. The pressure hardened "papreg," however, has a degree of weakness in being somewhat brittle. This, I uniquely meet by embedding or sticking on either one or both faces of the impregnated paper stock in its preparation, elongated tensile strands, threads or fibres, 13" which are laid or carded on the approximate or general axis of the sheet substantially paralleling the lines of stress they are intended to resist and in this instance longitudinally of the core members, 13a and 13b and the racket frame although they can also be laid crosswise or diagonally thereof where so wanted. This unique structural film is similar to that employed in my co-pending applications No. 455,350 and No. 492,914 already referred to. As disclosed therein, the tensile strands may instead of the above be carried on an intermediate film, or resin tissue between the layers of "papreg" instead of being directly attached to the "papreg" in the first or preliminary stage. As the impregnated paper 13' with its tensile fibre coverings 13" is wound about the core member or members, 13a and 13b as the case may be, after the manner of Figure 17, it will be seen that the final tube wall developed thereby is composed of many thin walls of somewhat brittle "papreg," (in its finally cured state when used alone), 13' or equivalent in combination with the interposed coverings of strands of high tensile strength 13" to offset the otherwise present slight brittleness and further add to the tensile and particularly the impact strength of the unique tube wall developed in the subsequent polymerizing or pressure hardening. Flax or linen threads, strands or fibres can be used for the tensile covering elements with great efficiency but synthetic as well as other vegetable, glass or other mineral thread substitutes may be similarly employed, the same being embedded in or imposed on the paper or film sheet 13' in the preliminary or unpolymerized state of the plastic, adhesive or embedding material. Figure 18 shows the tensile strands 13" embedded in or adhering to the opposite sides of the sheet 13' and paralleling on both sides the long axis of the sheet which is wrapped around the core members after the manner of Figure 17. The strands so embed more readily with the grain of the wood core which approximates the same general direction and so does not cut at right or abrupt angles across the tensile strands. This latter condition which arises when woven fabric with cross strands is present tends to cut down the tensile strength of the strands when pressed in combination with plastic as has been demonstrated in laboratory tests—a condition which my novel product avoids. However, when my strand coated film or sheet is not available, or desired, intermediate layers of plastic coated or impregnated woven fabric can be substituted therefor for added impact strength, etc., but I use this only as an inferior structural alternative. In still cheaper construction I use the "papreg" or equivalent without the fibrous reinforcement.

In Figure 19 is shown the method employed in folding the "papreg" sheet back and forth on itself for forming the laminations 14c and 15c of Figure 16 or 43 of Figure 15 when desired. This can be done individually with single sheets or with a plurality of sheets laid together and then folded as one—the Figure 19 indicating either procedure, diagrammatically. Other insert material can be combined with the "papreg" in the folding and Figure 20 diagrammatically indicates such a procedure in novel form introducing a still further novel feature of my invention used in various forms as will be subsequently noted. In this case the "papreg" sheet 13' with or without the tensile reinforcement 13" is protected (as well as reinforced) with one or more sheets of cellophane 45 or/and other suitable and preferably high tensile strength material which is interposed between the "papreg" 13' and one or more sheets of thermoplastic material 46 and preferably of a highly resilient nature such as "vinylite" and which becomes adequately fluid at or below the polymerizing temperature of the phenol-formaldehyde or other thermosetting plastic with which the paper 13' is impregnated or combined. The cellophane or equivalent member 45 is so arranged as indicated, to entrap the thermoplastic material 46 maintaining it when subsequently becoming fluid, away from the paper 13' and serving as a pressure forming membrane with which to pressure form and polymerize the thermosetting ingredients or associates of the paper 13' and must be of such a nature as not to disintegrate or react unfavorably with the adjoining materials under the heat and pressure to which the assembled materials are subjected in molding. This laminated set-up can be used not only in the folded form of Figure 20 but likewise as the wrapping of Figure 17, or in other laminated setups. It can be employed not only in forming the racket frame but likewise in molding any structural or plastic element. When the racket frame is being molded in the form, these included elements, as 14c and 15c in Figure 16 or wherever used, have the ends of the sandwich fold (or sheet) of Figure 20 preferably closed, sealed or properly held together in the form (not shown). The mold temperature is then raised to the polymerizing temperature, say around 300 degrees F. in the above combination and the pressure of 25 pounds per square inch or more, applied for the required time for the thermosetting element or elements. It will be seen that as the entrapped thermoplastic element 46 becomes liquid under this heat and pressure it develops internal fluid pressure and exerts this hydraulic pressure at all points on the interior surfaces of the several "papreg" walls through the medium of the intermediate membrane element 45. This hardens the "papreg" and thermosetting elements of the molded structure and, on cooling, leaves same in combination with the strong resilient thermoplastic material 46 as well as the tensile film 45, integrated in a uniquely strong and resilient structure. Other forms of this will be subsequently shown. The same unique lamination can likewise be the wrapping forming the tube elements 13, 14, 15 and 16 of Figures 1, 4, 11, 16, etc.

Figures 21 and 22 indicate methods employed in increasing the size or cross section of the laminations in the frame at specific or progressive points as in the lower portion of the racket head approaching the throat, etc. In Figure 21 the core member as 13a may remain of constant dimension while increased thickness is obtained gradually by increasing in stepped-up formation the number of layers or groups of layers of the "papreg" sheet wrappings 13'. Alternatively in Figure 22, the sheet wrappings 13' may remain constant while the core is increased gradually in size which can be done, as shown in this case, by the increase in the number of core members by adding the core 13d, inserted in this instance between two core members 13a and 13b, or by tapering the core as in 13d. A combination of both the methods of Figures 21 and 22 can also be resorted to. In Figure 23 is shown an alternative method of wrapping the tube cores as contrasted to that of Figure 17 wherein the individual sheet 13' is wrapped over and over around the core. In Figure 23 a number of layers of the "papreg" and/or other sheet material to be employed are laid up in the flat and then the core 13a is laid on same and the laminated bundle wrapped as a unit in conjunction with turning the core over and over following the dotted arc 47 from the original flat position (indicated in dotted lines) and so on. Any combination of laminations and materials may be employed in this wrapping procedure but in Figure 23 is also indicated the combination construction utilized in the folded formation of Figure 20. Thus, the layer next to the core 13a consists of one or more sheets of "papreg" 13', followed by one or more layers of thermoplastic sheets 46 encased in cellophane or equivalent film 45, followed in turn by more "papreg," encased thermoplastic and "papreg" layers 13' as indicated, which can be carried on indefinitely and varied at will. This or similar wrapping employed on the cores for the tubular members of Figures 1, 4, etc., produces under heat and pressure as described a remarkable internally fluid pressed tube wall structure as set forth in connection with Figure 20.

Figure 24 shows the manner in which I further preferably prepare my flat core wrapped tubular members for conforming more readily and evenly to sharp curves as found in the racket frames. By running the wrapped cores between opposed pinions 48 with suitable rounded indenting teeth 49, the core 13a and the wrapping 13' are so indented or compressed and crimped regularly as to distribute the bending more uniformly over the bending length both as regards the core and the crinkles or bulges developing in the wrapping on the compression side and edges and likewise make the bending more facile. Normally and without this provision the side edges and the compression side of the flat wrapped core strips will develop irregular and deeper wrinkles in the wrapping when bent. By this crimping and indenting, however, the wrinkling becomes only slight in depth and distributed regularly and on closer centers over the bent area, thereby securing a stronger and better appearing molded structure when pressed and avoiding the forming of severe weakening wrinkles. Shallow wrinkles it has been found by laboratory tests with "papreg," in which the effective thickness is not reduced and in which plies are well bonded give no reduction in the strength properties whereas more severely wrinkled specimens in which the bonding of the plies is not so perfect may cause from 30 to 80 per cent loss in strength properties. When preferred, opposed side pinions (not shown) for also indenting the edges along the top and bottom pinions 48 may be simultaneously employed but it is believed these will not be found necessary as the crimping of the top and bottom surfaces of the wrapping should in most cases cause the side edges to similarly and roughly conform therewith in satisfactory manner.

In Figure 25 is indicated diagrammatically still another method of wrapping core members 13a or groups of wrapped cores (as 17 at the outer end or lower portion of the racket frame 1 in Figures 1 and 4) and as alternative to the methods disclosed in Figures 21 and 22. In this instance instead of the wrapping material 13' being folded around the core elements in long sheet form, it is helically wound in the narrow strip form and stepped up in layers as indicated where increased strength and thickness are wanted to meet gradually increasing stress leverages. When pressure molded, after wrapping as shown, the stepped surfaces appear more or less melted one into the other, which also applies to those of the alternative Figure 21. The strip material can be any of the wrapped laminations already described including those of Figures 19 and 20.

Figures 26 and 27 present a modified form of the frame structure in which the wrapping and certain other features of the laminations are dispensed with. In this case, wood veneer, as well as "papreg," etc., can be used to good advantage both for ornamental effect and high structural efficiency, due to the unique placing of same. The core elements 50 are laid up (preferably being cut in stepped-down widths to roughly approximate the tapering or rounded contour of the frame cross section), with strips of veneer 51 interposed and on the top and bottom as shown in Figure 26. These strips are impregnated or otherwise properly associated with plastic and are wider than the core elements 50 as predetermined in each case. The cores and the veneer strips all being flat and relatively thin are easily bent while in loose formation around or in the racket frame form. In such position the molding pressure is applied through the pressure tube 23 the same as in Figures 4, 11, etc., and the laminations compressed and integrated. In this pressing action it will be particularly noted that the extending edges of the veneers 51 are forced upward (with the exception of those of the top one which are forced downward) so as to fold around and enclose the exposed exterior of the core members 50 giving the veneers, as shown in Figure 27 after molding pressure, an extremely strong U-shape, a shape in which they originally could not have been bent around the frame form but which, after being bent in the flat, they can be crushed into by the fluid or other form pressure. For further strengthening, if wanted, the veneers can be cut over wide so as to overlap adjacently in the pressing to produce double thick joining areas indicated fragmentarily in Figure 28. A great many variations and assortments and additions of materials may be made in the frame structure of Figure 26 and its development in Figures 27 and 28, including relative grain axes arrangements where wood laminations are involved. In Figure 26, as indicated, I provide a grain arrangement unique in frame construction wherein the main core members 50 have their grain axes extending longitudinally in customary manner with the exception, however, of the middle core lamination which uniquely has its grain disposed transversely to produce a balanced formation in the odd numbered core ply set-up and give the frame strength in both directions not heretofore found in racket frames. The same provision is made with respect to the veneers 51, the two central ones having their grain disposed transversely, corresponding to the core 50 between same, while the outer pairs 51 have their grain axes extending longitudinally. A further modification of this latter arrangement may be employed where all the veneer members 51 have their grain axes disposed transversely and such an arrangement is indicated in Figure 28. With this combination the cores 50 may also all be arranged with their grain axes longitudinal by contrast and such a provision is also indicated in Figure 28. Alternatively the reverse combination may be employed with the cores 50 all arranged with their grain axes extending transversely and the veneers 51 all having their grain axes extending longitudinally. The edges of the veneers 51 may all be cut, notched or darted at spaced apart points, as elsewhere described, as may be found necessary or preferable in conforming to longitudinal frame curves when being pressure molded into their final bent or U-forms. In the use or substitution of other materials in these structures as suggested, "papreg" or equivalent plies and in the forms of Figures 19 and 20 as well as in the similar conventionally plied sheets, may be substituted for the veneers 51, in whole or part. The cores 50 may be similarly greatly varied as regards materials and metal members may be included with or in addition to both members 50 and 51.

Figures 29 and 30 show the frame section before and after pressure molding corresponding to that of Figures 26 and 27 with the difference that the core members 50 (corresponding to 13a etc., of Figures 4, 16, etc.) are in this case wrapped with the "papreg" 13' or equivalent, the same as in Figure 4, etc., instead of being laid up as in Figure 26. As indicated in Figure 29, the core members 50 can be scarfed transversely as well as longitudinally for conforming to curves where found necessary or desirable, and this applies the same to the cores 13a, etc. of Figures 4, 16, 26, etc., whether indicated therein or not. Thus, as indicated in Figure 29, where the bend brings the upper side of the core or strip element 50 in compression, transverse scarfing is used, when desired, on the upper side of same as indicated by dotted line 51a (similar to 44a of Figure 15). Conversely, at such points of bending as bring the under side of 50 in compression, the transverse scarfing is located on the under side as indicated by dotted line 52. In these cases a layer of tensile material on the tension side of the strip bend is left uncut by the scarfing. Longitudinal scarfing 44 which runs with the longitudinal graining of the strips, may extend the whole length and on both sides of the strips 50 at the points of transverse curving to facilitate the easier accommodations of the wood in the pressure forming as developed in Figure 30. It should furthermore be noted that in the case of all of my "papreg" or other wrapped tube-like members, I do not limit the plied wrapping to "papreg" but other suitable sheet or strip material including thin wood veneer, impregnated, coated or otherwise suitably associated with plastic or bonding adhesive, may be similarly employed. Also the grain or fibre axis of the impregnated "papreg" paper or other material may be disposed in different directions and combinations in any and all cases in the same and varied ways described herein as regards the wood laminations.

Figure 31 shows a slightly different arrangement of the core or strip members for substitution for those of Figure 29 and kindred structures. In this instance, the core 50 is composed of a plurality of flat strips 50a, 50b and 50c and is beveled on the sides (instead of rectangular as in Figures 29 and 26) to better accommodate itself to the mold form as in Figure 30 (or Figure 27). As in other cases, the core 50 may be greatly varied in its arrangement. As shown, it is provided with a plurality of flat wood veneers or wood strips in loose assemblage. Also, as before, the grain axes of these members may be varied. In this instance, I uniquely employ the balanced construction, having the top and bottom strips with their grain axes extending longitudinally and the central strip having its grain transverse. Metal or other high tensile strength strips may be included as part or all of the core 50 as well as structural and/or semi or non-structural strips. Thus, in Figure 31, the outer strip 50a may be high tensile steel alloy for the upper side of the frame cross section of Figure 29. Correspondingly, the lower strip, as 50c, when located in the bottom core of Figure 29, can also be high tensile steel alloy. The metal strips can be combined with the companion strips forming the core such as balsa, or ash, etc., to be wrapped together, while properly coated or associated with adhesive, to complete the individual tubular units.

Figures 32 and 33 show my construction adapted to one of my ways of molding a frame having a round cross section. The tubular core-wrapped members in this case are formed of strips of the proper and assorted widths as indicated and in my wrapped arrangement are set up in the molding form with a central rod-like or round member 53. This latter in order to offer facile bending, the same as the thinnish flat core strips, is likewise preferably composed of several loosely assembled thin flat strips as 53a, 53b, 53c, and 53d and having the grain of all preferably extending transversely, as indicated, rather than longitudinally, while that of the strips of the core members 50 runs longitudinally. The inner or compression sides of the strips 50 have the proper longitudinal cuts 44 and scarfing out of the material sufficient to permit of the easy bending of the strips 50 transversely to the round contour cross sections of Figure 33, and the transverse scarfing already described for longitudinal curving is of course also provided for any or all of the strips but only when greater thickness makes it necessary or desirable, as in other cases described. When assembled in the racket or frame mold 21a in the platens 21 and 22 in the relation indicated in Figure 32, the plastic forming molding pressure is applied through the tube 23 (or other equivalent means) on the movable mold member 24, and the loosely assembled elements are compressed into position and shape to form the frame in the round cross section as indicated in Figure 33.

In Figure 33a is indicated a modified form of the rounded molded frame and method of forming same so as to likewise obtain the greater strength of unique rounded veneer or other laminations which give remarkable resilience as well as stress resistance in all directions. The rounded central core 53' is formed of the three laminations in this instance, 53e, 53f and 53g which are preferably arranged in balanced ply as regards their grain axes and are pre-glued or bonded together before being placed in the molding form. In order to readily bend same to the frame curves in the form assemblage the outer members 53e and 53g are scarfed or V-cut at 51 and 52 at necessary points on the pronounced curves so as to accommodate themselves readily to same while bonded to the relatively thin and pliable central strip 53f which preferably is not scarfed. The scarfs in the outer members cut almost through these leaving only a thin pliable gluing wall jointed to 53f as indicated and so readily permitting bending of the bonded ply to accentuated and compound curves. The central strip 53f is preferably of good structural wood or equivalent material and if the grain is laid crosswise as indicated will give a strong web within the frame cross section for resisting the bending stresses applied at right angles to the plane of the stringing. The members 53e and 53g, on the other hand, are preferably of balsa, light semi-structural or suitable filler material with the grain, as in the balsa case, or other wood, opposite to that of 53f to form a balanced ply. The reverse of the above or other grain arrangement can also be employed as wanted. About this core 53' is bent in the molding, a plurality of laminations, in this case 50d, 50e, 50f and 50g of structural wood veneer as ash, or any of my "papreg" laminations, etc. These are laid in the form on opposite sides as indicated by the dotted lines and bent and pressed into position (as indicated by dot-dash lines) in the pressure molding and bonding operation after the manner of Figures 32 and 33 in connection with the necessary impregnation, coating or other association of the laminating materials with bonding adhesives, plastics, or the like, as heretofore. In this arrangement as before, spring reinforcements of high tensile strength 10 and 12 (as well as others) can be included in the laminations as indicated and these preferably of the desired heat-treated and tempered steel alloy as before although other and non-metallic and plastic strips can be so used. I also preferably maintain my outer grooved form 20 as indicated. The grain arrangements of the outer laminations as 50d, 50e, 50f and 50g forming the structural shell, when of wood or equivalent, can be in balanced construction with alternately oppositely crossing or differently arranged grain axes and to particularly provide against torsion and shearing stresses as well as the bending stresses, such grain arrangement being indicated in Figure 33a, which is the preferred arrangement, but many others may be made including extending all or most of the grain axes longitudinally of the frame.

In Figures 34 and 35 is shown another modified method of forming a frame in rounded cross section but with the laminations in relatively flat position by contrast with those of Figures 33 and 33a. The tubular wrapped core members are arranged as indicated in Figure 34 and are then pressure molded as indicated in Figure 35, the mold being indicated in dotted lines and the molding procedure being as already described.

In Figures 36 and 37 is shown a slightly more complicated set-up of the laminated members of my frame construction employed where it is desired to mold in the stringing holes along with and simultaneously with the forming of the frame. In the previous figures the racket frames have the stringing holes drilled in after the molding or integrating, after the manner of all wooden rackets. Herein, however, I provide movable pins 54, located in the mold form to form the various stringing holes 4a and then provide and lay the various tubular wrapped core laminations 50 and 50' in two opposed sets on the opposite sides of the pins or hole-forming elements 54 so that when the frame assemblage is pressed and removed from the form it is in the shape indicated in Figure 37 with the holes 4a smoothly formed ready for stringing and the time and expense of hole drilling dispensed with. As further cross bands between the two vertical rows of laminations, I also include, when desired, any or all of the metal reinforcing bands 10, 11, 12, the same as in my other frame structures, or other equivalent through-banding laminations, with openings for the stringing holes as in Figure 16, etc.

In Figures 38 and 39 is shown, somewhat diagrammatically, the general plan of a mold for forming the racket frames in the manner already described, and either in a one piece frame as in Figure 38, or in a longitudinally halved two piece frame which has the two halves joined after molding as with my turnbuckle construction. As already described, the frame elements forming the laminations are assembled in the molding groove 21a formed by the shaping platens 21 and 22 and the admission and flow of the fluid in and through the pressure tube 23 is controlled by the control valves 23a and 23b. By admitting the fluid pressure from the 23b end of the pressure tube 23, it will be seen that the loose laminating materials are pushed forward as they are pressed downward within the form and this is an important and unique arrangement in the pressure forming of my molded frame. The platen forms are provided with any necessary holding means for positioning and supporting supplementary frame attachments such as spring bridge 3 or turnbuckle 2 parts (not shown) where same are incorporated and bonded with the racket frame in the pressure molding process. The forms and the method of applying pressure can, of course, be greatly varied, as desired.

Figure 40 indicates in cross section a specially designed pressure tube 23 wherein a molded soffit 23' is formed along its inner or molding face of properly formed rubber or other suitable material of the intended and grooved shape of the outer edge or face of the racket frame. This so provides as an integral part of the pressure tube a substitute for the separate molding strip 24 of Figures 4, etc., which it so eliminates and is relatively hard as compared to the expansible and flexible walls forming the pressure chamber of the molding tube. It also can be used in combination with the metal formed strip 10 which becomes a part of the racket frame as well as a shaping and molding member as in the case of Figure 11.

In Figures 41 to 48 inclusive are shown further adaptations of my frame construction to rackets and particularly to light forms employed in badminton, racquets, squash, etc. The frames of Figures 41 and 42, particularly suited to badminton, are pressure formed of two of my tubular wrapped core members 55 and 56, the inner tube 56 having its ends joined centrally of the frame end at 56a while the outer tube 55 extends around the frame with its ends terminating in or at the base of the handle. Inclusion of further reinforcements and graduated cross sections is optional. While open or solid throat construction can be used, I prefer my open throat construction for spring action and reduced air resistance and accordingly provide the spring bridge and throat reinforcing piece 3, preferably molded in place with the frame as already described, the ends 3" being tapered or graduated for stresses as noted in Figure 48. In these lighter frames, strong resilient plastic bridge pieces may be used in lieu of and similarly to my spring metal bridges. As noted in these figures the inner tubular member 56 spans the throat and is integrated with the bridge member 3 as further detailed in Figure 45. In order to provide the necessary forming pressure where the tubular member 56 spans the throat as an integrated part of the bridge span a localized section of pressure tube 23" is provided in the form as indicated by dotted line in Figure 42 and operatively connected with the outer pressure tube 23 (not shown) so as to properly mold this section coincidently with the molding of the rest of the frame. The bridge may be outturned of the head as in Figure 41 or be inturned as in Figure 42 and the frames may have my indented end form, or more conventional shaping as in Figure 41. The tubular member 56 can be interiorly reinforced and more particularly at the bridge portion as indicated in Figure 45 with a strong thin metal or other resilient member 50b and the same applies to the cores of any of the tubular members at specific points or for any desired or over-all length, the shanks being so built up as in Figure 47. The frames may be further reinforced as well as ornamented with facings 57 adjacent the throat area as indicated in Figures 42 and 44. These facings may be of veneer, "papreg," or any other desired material including metal which is preferably placed in the forms prior to molding and with the necessary plastic or adhesive and integrated with the frame under the pressure forming. Ornamental and/or structural embracing and reinforcing bands or rings or similar trimmings 58, also employed in Figure 1, are preferably included, in plastic union with the frame. The frame shank and handle can be of any desired form. In Figures 41 and 47 is shown a more conventional shank form with the tubular members bonded together along their length 1a in the molding, with (or without) any additional laminations or reinforcements interposed between, when desired (not shown). In Figures 42 and 46 is shown a unique variation of my shank construction wherein I spread the tubular shank members 55 apart gradually from the holding ring or band 28 to the handle 29. As shown, I preferably reinforce the tubular member 55 with a second similar tubular member 55a along this length molded with same. The two diverging shank elements are strutted apart at intervals by the struts 59 which are preformed with suitable bonding ends and placed in the form with the other elements to be joined together. At the base in the handle area the shanks are joined by integrated blocking 60 and the handle formed in any of the customary ways or as already described. In Figure 48 is shown the split tapering ends 3" which I provide in forming the bridge and throat piece 3 of Figure 41, these being formed in this way to graduate the stress resistance at these points of changing reinforcement where abrupt changes may lead to fractures. The form of graduation may be greatly varied, this being only one of many possible forms which may be so utilized.

Figures 49 to 63 show modified forms of my spring bridge piece 3 for application to ordinary wooden frames as well as my special molded racket frames or other types. In Figure 49 the spring bridge 3 is formed in two similar right and left halves 61 and 62 each of which can be incorporated with a half frame section (as in the case of Figure 39) and then joined together by riveting 63 when the two frame halves are joined together and with a non-metallic cushion washer 63a in between. 61 and 62 can be stamped from spring steel alloy strip 12 with the slotting out, etc., for the stringing holes and lightening as already described and are preferably extended for a distance up the sides of the frame for reinforcing the frame, particularly when the bridge is attached to a wood frame of ordinary construction. When the throat is contracted as already explained, it will be seen that the portions supporting the longitudinal strings anchored in or passing through same are forced upward and so move up and down with the impact of the ball on the strings. In Figure 50 the same spring action is obtained in a similar halved bridge construction in which two spring rings 64 and 65 are employed in lieu of 61 and 62. The rings 64 and 65 can be welded or otherwise joined to reinforcing strips 12 (of any desired length) and, in addition, can be riveted at 66, if desired, through the frame which can be of any desired construction and including wood, and with throat spring reinforcing and anchoring strips 10 added. The spring compression rings 64 and 65 are riveted together at 63, the same as with 61 and 62 of Fig. 49, a provision which permits the bridge in halves being applied to separately formed half frames when wanted, as in the case of Figure 49, and then joined.

Figure 51 provides much the same spring bridge action as Figures 49 and 50 but has a one piece spring bridge 3 which can be attached to the frame, if necessary, after the frame is completed, by riveting 66 as indicated—or it can be brazed, welded, or "cycle-welded" at 26, or otherwise joined to the reinforcing members 12, if the latter are used, as shown, all of which structure is anchored by the points 41 and the special bonding adhesive such as "cycle-weld." The bridge 3 is herein formed of a spring steel alloy indented ring or joined strip centrally riveted at 63 and expands and contracts upwards and downwards with the ball impacts and frame contractions after the manner of my other bridge forms.

Figures 52 and 53 show my spring bridge 3 action provided by a single steel alloy strip stamping 67 which is attached to the racket frame of any type to secure the expanding bridge and throat results with a maximum of simplicity. As in previous forms, strip metal of the width of the frame is employed and of the proper length to reinforce the inner sides of the frame at least along its lower and most heavily stressed portion weakened by stringing holes. The strip 67, in stamping, is slit on either side for the portion spanning the open throat of the racket frame so as to provide outer members 67a which bend downward while the center band 67b remaining is bent upward to carry the central group of longitudinal strings in my usual manner. The strip 67 is slotted out as heretofore for stringing holes, anchoring prongs 41 lightening, etc., and attached to the frame with the adhesive 26 and further rivets (as 66 of Figure 51, etc.) or equivalent if also wanted. These bridges can be stamped out very simply, are light of weight and inexpensive and can not only be readily attached to wooden rackets or my various composite and molded types but likewise can be brazed, welded or bonded to metal rackets.

Figures 54 and 55 show another variation of my bridge and contractable throat 3 which gives neat appearance and strong positive contraction and expansion action to the frame and throat. As will be noted the frame 1 is provided with special shoulders 68 which form sockets on either side of the throat for receiving and firmly holding an expansion spring bridge ring 3 which is preferably indented and shaped on its upper side after the manner of previously described bridges for moving the central longitudinal strings up and down as a group. In this instance six such strings are so included but as in the case of my other bridges this can be varied at will, including more or less strings by changing the size of the bridge member when making the design of same.

While this bridge can be used independently it is very desirable to incorporate it with the inner strip metal or tensile reinforcement 12 to which it can also be riveted at 63, as indicated, and/or otherwise bonded. Similary the metal or tensile outer reinforcing band 10 can be incorporated to advantage as in previous forms and both 10 and 12 can be confined if desired, to merely lower portions of the frame as shown, stopping at any desired point. A special feature is also included in member 12, which can also be used in any of my racket forms, in the stamping or forming of same in a wave line, as indicated, designed to give greater frame thickness opposite each stringing hole to offset the weaking of the frame by the presence of these holes, and also increase spring action at the string anchorage points. As heretofore, members 10 and/or 12 can terminate in or adjacent the holding ring or band 28, where they taper off in this instance, or continue to stop at any other desired points or point. Also, in this instance, is shown a front rather than a side holding pin 27' for firmly securing the throat and bridge members 3, 12, against the string pull, etc. This pin form can be used in any of my rackets.

In Figures 56 and 57 is shown a further alternative development of the spring bridge 3 by combining a sheet metal or strip metal stamping 69 with spring compression spaced apart wire rings 70 and 71 to form the spring bridge anchorage. The strip metal 69 is stamped to provide a customary slotting (as 37, etc. Figures 12 and 13) with anchor points 41a and in addition outward turned face flanges 41b which are preferably flush with the faces of the frame on the throat sides. The upper portion of the stamping has the flanged edges turned back in the opposite direction to enclose the tempered high tension spring wires 70 and 71 (which can also be further brazed or bonded thereto) which are ring shaped and left uncovered, however, on the lower portion where they span the throat as shown. Within the central string support so provided is included as in my other bridges the usual plastic and/or other cushion string support 3g for relieving the strings and maintaining them away from the metal edges and bearings. This bridge and open-throat reinforcement can also be readily attached to an ordinary wooden racket and after the manner of attaching my other bridge forms and by any or all of the ways already shown or described. It should also be noted that the reinforcing bands as 10 and 12 of Figures 1, 3, etc., or 67 of Figure 52 and particularly those portions forming the open throat reinforcements of various figures may also be provided with the turned flanged edges the same as 41b of 69 of Figures 56 and 57. These can also be provided with the turned in prongs or bonding teeth 41c which lie flat with the longitudinal grain of wood laminations so as not to cut across same or can be similarly disposed between the lamination joints.

Figures 58, 59 and 60 show another modified form of spring-bridge 3 combining wires and strip or sheet members something after the manner of Figure 56 and adaptable to various types of frames. In this case, however, the wires 70' and 71', after forming the spring bridge string anchorage, circle the throat contour, as shown, including the face anchoring pin 27'. The longitudinal string support is provided by the strip member 72 which enfolds and joins with the wires 70' and 71' at its edges while the latter are preferably left bare below same for spring action at these points 3f and again enclosed and joined with the lower strip members 12' which can also continue upward of the frame to any desired point (not shown) after enclosing the wires—the same as the other members 12 already shown. It will be readily seen that with this bridge piece the resilient expansion and contraction action actuates the spring wires 70' and 71' at their bared points 3f to move the string bearing portion of the bridge back and forth as a whole which is the desired objective in all cases. It will be noted that the interior faces of the open throat framing do not meet at the point of entrance into the holding band or ferrule 28 but instead are strutted apart by a cross piece 28b between same which is formed as a turned-in extension of the member 28. This provides particularly good bending contracted when the throat and bridge are contracting by the clamping already described for these throats and this arrangement may be made in all of my open throat arrangements and as further shown in Figure 63 and others. In Figure 58 the band or ring 28 is also formed with tapering stress graduating extensions 28a on the top and bottom of same, these being formed in the stamping on the front faces of the shank rather than on the sides as in the case of Figures 1 and 63. Either arrangement or equivalents may be used on any of the racket forms. The frame of Figure 58 is indicated as the typical conventional laminated wood frame with the exception that the central lamination is cross grained in relation to the other laminations which are longitudinally grained, giving the balanced ply construction described herein to meet various stresses, etc., not heretofore provided for in rackets of this type.

Figures 61 and 62 show still another variation of a simple wire version of spring bridge 3 wherein two cross wires 70'' and 71'' are employed to form the bridge span and string support. These wires are strutted apart by metal cross tie flat wire or strip spans 73 which are interposed between the strings and embrace and are brazed or bonded to the bridge wires 70'' and 71'' and form the necessary holding base for the string anchorage strip located on the under side. The ends of the wires 70'' and 71'' are flattened into knifelike members which are embedded in the racket frame and in such direction relative to the grain of the wood or fibrous laminations as not to weaken same by cutting across the grain. These can be inserted in a wood or composite racket and the frame reinforced at these points with the tapered collars or bands 74 bonded around the exterior of the frame, the graduated points 74a of which relieve abrupt stress resistance. Similarly, the collar band or ring 28 is provided with the graduating points 28a for the same purpose and the spacing between the two collar reinforcements 74 and 28 permits facile whip action in the frame throat at this point.

Figure 63 discloses a combination of my turnbuckle at both the end and throat of the racket frame with my spring bridge features and in a manner similar to the throat form of Figure 54. In this arrangement a turnbuckle 75 is combined with the spring bridge ring 3. This is also preferably, but not necessarily, combined with the metal tension members 12, the ends 2b of the turnbuckle being riveted at 63 and/or brazed or welded to 3 and 12. The turnbuckle sleeve 2a operating within the bridge ring 3 expands or contracts the latter and the frame throat at will. By expanding same, it will be seen that not only is the cross stringing of the racket head directly tightened but that likewise direct action is brought to bear on the longitudinal strings anchoring in the bridge piece, these being drawn down and tightened as the sides of the ring and throat are pushed outward by the turnbuckle. The action of the outer turnbuckle 2 in spreading and enlarging the racket head and so tightening the strings and particularly when uniquely strung in the manner shown has already been outlined. The twining of the longitudinal strings at 4b before their terminal parting is not new but the terminal arrangement in relation to the turnbuckle is. The turnbuckle 2 in this instance is formed with and united with the frame 1 through the medium of the extending tongues 76, 77 and 78 integrally formed or suitably joined with the turnbuckle ends 2b. This turnbuckle can be combined with the frame ends coincidently with the molding of same in the case of my molded and laminated frames by properly preparing and including the members 2b in the form assemblage, or, in the case of any wooden frame as well as these other frames, they may be strongly joined with the frame after its manufacture. This is accomplished by either leaving slits between laminations for receiving the tongues 77 and preferably countersunk seats for the tongues 76 and 78, or by sawing and cutting the frame ends for such reception after making same. The tongues 76, 77 and 78 are then coated with the proper bonding material preferably such as "cycle-weld" 26 or equivalent and then bonded into the frame under pressure at the necessary temperature. Through-rivets (not shown) may also be included if wanted. The tongues 76, 77, 78 are preferably slotted out with spaced apart apertures (similar to 37, etc., of my metal tension members already elaborated on) both for weight elimination and better interbonding with the frame under pressure. My novel inturned or indented spring arch at the end of the frame, which also protects the turnbuckle from ground strokes, should preferably be so shaped that the turnbuckle operating in the center of same lies on a dead center, so to speak, with the result that as it is operated it neither pushes upward (that is to say outward) or downward but spreads the frame on the dead center axis. The arch of the frame end will then still pull inward with the impact on the longitudinal strings and spring back but will not permit the center of the frame to distort outwardly which is to be avoided, and which would occur were the turnbuckle combined with the conventional oval shaped racket frame.

In Figures 63a and 63b I show preferred forms for the bonding points 41 and 41a formed in the stamping of the metal band reinforcing strips 10 and 12 or the bridge throat extensions, when so desired. By either stamping out a central opening 41bb (as in Figure 63a) or by crimping the point with the waves 41cc (as in Figure 63b) or by employing both improvements at the same time, a greater bonding is secured between the points 41 and the laminations or material forming the frame with which the band reinforcements are integrated in the molding.

In Figure 63c is shown another arrangement for firmly uniting my turnbuckle 2 with the top ends of the halved frames in lieu of the arrangement of Figure 63 or Figures 5, 6, and 7. In this instance the threaded end 2B is formed on a tubular ferrule which is provided with symmetrically disposed tapered extensions, in this case four in number, i. e. 76', 78', 77' and 77" and having their pointed ends turned in for bonding in the racket frame. This tubular piece is bonded on the frame and preferably with pressure bonding adhesive coating 26 as already described. While this can be applied to any type of frame, it is particularly suited to my molded laminated form as in the mold assemblage of the materials the turnbuckle tube 2b can be placed in and held in position in the form with its extending tapered ends bent outward (as indicated in dotted line) to accommodate the laminations of frame forming materials. As the molding pressure is applied, compressing these materials in the shaping form, the tapered ends are similarly bent and compressed inward and formed flush with the finished frame surface with which they are integrated. To make the bonding still more secure, a wedge member 2d may be pressed and bonded into the open outer end of the tube, the wall of which can be interiorly tapered, as indicated, to provide a still firmer locking of the wedge and frame material. Other variations of my turnbuckle can also be made. It is also possible to cut or form the screw thread for the male portion of the turnbuckle directly on the frame end where the wood or other material is sufficiently hardened by chemical impregnation or treatment as elsewhere described herein but ordinarily this is not deemed advisable to meet the great strains developed.

Figures 64, 65 and 66 show various treatments for the outer end construction of laminated (or other) frames embodying my special features for spring action and resistance to frame distortion by the generally common elongation difficulty. In Figure 64 this aim is furthered by including an extra insert 79 bonded between the laminations 42a and 42b. This extra thickening and stiffening of the frame I at this central point normally given to continuing and increasing "pointing out" distortion provides novel resistance to this trouble in a wooden or other conventionally shaped frame. In Figure 65 the unique and peculiar advantages of my indented frame end for both neutralizing the above described frame trouble and providing my spring action are provided in a laminated frame after the manner of Figure 15. In this instance, however, the indentation is by a wide easily bent curve 80 not requiring scarfing as in the case of the sharp indentation of the frame end in Figure 15. By combining with this a rather sharp curve at points 81 a unique and very desirable frame shape is produced giving strong spring action as well as relieving the central string strain and transfering same more to the adjacent side longitudinal strings, which are not worked as hard in play by direct ball impact. If wanted, scarfs 44a on the compression side of the laminations and preferably staggered as shown may be included but the bends can generally be made without same if preferred. This and my other unique shapes may be used on any type of frame. In Figure 66, the end frame indentation is given a central flat section 82 for carrying the two or more central strings and this shape, with its turns sharper than 80 of Figure 65, is preferably accomplished in the case of the thicker wood laminations with the scarfing 44a on either end of the straight section 82. The intermediate tension laminations 43 of "papreg" or other tensile elements can of course be also embodied in the construction of the previous figures and the various shapes, etc., set forth, employed in any of my rackets, as already noted. In both Figures 65 and 66, as well as Figure 15 and the other related figures, it is preferred that the inturned or indented end arch be so shaped as to remain on dead center in resisting the pull of the transverse stringing of the frame, the same as described in connection with the turnbuckle spread as in Figure 63, while responding inwardly with the impact pull of the longitudinal stringing in the momentary spring action attending same.

Figure 67 shows one of the preferred forms of my rackets wherein my unique spring features are combined to produce a super spring action racket of unprecedented resiliency. In this case my frame spring indentation is not confined to the outer end as 80 but the same unique feature is included in the side arches of the frame I at 83. While this revolutionary shape can be employed with any type of frame and with or without my spring bridge and open throat, it is particularly suited to the laminated frames and to the use of my slotted out metal tension (and compression) members 10, 11 and 12, any or all of which can be included or not. However, by including the inner tension and compression band 12 around the inner face of the head frame (and preferably with the spring wires 12a included as indicated and as in Figure 3, etc.) I secure maximum reaction in the spring action developed in the frame when so uniquely arched or indented inwardly on the three sides of the head at 80 and 83. These inturned arches in the frame are preferably connected across the head with more closely spaced stringing than the other portions so as to form a longitudinal and a transverse band of close stringing crossing each other approximately in the center of the head where most of the ball impacts are received and anchoring in and/or adjacent the inturned arches. These arches in the frame can be formed of graduated thinner cross section as indicated in Figure 67 so as to produce greater bending action at these predetermined points while the intermediate and outwardly turned arches at what may be designated as the four corners 84, 84, 85 and 85 of the racket head are preferably formed with a graduated thicker cross section to resist and snap back the inward bending arches as the latter spring inward and back in play. To accentuate this action and resistance in these four corner arches, I preferably also insert or combine additional reinforcement and/or thickening of cross section in the four arches, 84, 85 for which separated sections of the spring slotted-out member 11 may be employed. To still further increase the spring action of the arches the outer slotted-out spring metal or other band 10 can also be included as before and as indicated in Figure 67. These several reinforcements need not necessarily be of metal but can be of any synthetic, organic or other material adding the desired resilience and strength to the shaped frame. The use of rawhide for the band 12 is particularly suitable in providing good resilient tensile material of light-weight as well as also providing a desirable seat for the stringing. This material is not new in tennis frames but, in combination with my spring arches and as a tension member for same, it is. The use of suitable heat-treated metal, however, will, because of superior strength and spring action, permit the use of lighter intermediate laminations of specific gravity lower than customarily employed in all-wood racket frames, including, as already described, my light core filled tubular plastic formed members which also and alternatively can be relied on for the main reinforcement themselves. In building a laminated frame to my unique shape, it can be molded by my methods herein described or fabricated by prevailing old-fashioned methods of gluing-up wood laminated frames. The separate wood laminations in either case can be readily pressed into the inturned arches 80, 83 which can greatly vary in shape from flat or slightly indented points or areas to deeper and larger curves all of which, after the racket frame is built, receive their final and complete inturned spring action shape and positioning in conjunction with the clamping of the frame in the stringing procedure, when my preferred stringing process is followed as described. The shapes of Figures 15, 65 or 66 are also particularly suited to these arches or indented points—sides or top or both.

It should also be understood that my specially shaped head of Figure 67 (and other figures as well) can be combined with the conventional solid throat employed in most wood rackets in lieu of my spring action open throat. Figure 68 indicates an alternative throat of such construction with the solid wedge 86 in place of the open throat for use in the frame of Figure 67 when so preferred. However, for the maximum spring reaction and ball speed, it is preferred that one or another of my spring bridge and open throat pieces be combined with the inturned spring arches of my head frame. One such arrangement, as 3 in Figure 67 is shown. In this way, the frame reaction on the string anchorages responds from all four medial points of the head—all of which provide spring arches which spring inward with the ball impact and then fly outward to shoot the ball, and as never before, from what become truly bow-strings. It should also be particularly noted that my inturned arches as in Figure 67 reduce the air resistance in stroking the ball, this being the more pronounced owing to this reduction being brought about at the points of greatest leverage or stress moment.

In the stringing of the head, it is preferred that the inturned or indented arches be clamped inwardly as a whole before stringing the head (or in some cases in certain preferred rotation before completion of the stringing) as by the clamps 7, 8 and 9 (indicated in dotted line) and the racket head and the throat with bridge 3 be contracted by the clamps 5 and 6 (also indicated in dotted line) after the manner already described. The resistance tension developed in the various arches by this clamping contraction is preferably so arranged that it is greater than or at least in equilibrium with the inward pull of the tightly strung stringing prior to the release of the clamps 7, 8, 9 and likewise 5 and 6 so that the head thereupon, on clamp removal, expands and so further tightens the stringing or at least remains in balanced equilibrium with same. Under this condition, and when the racket is so strung, it will be seen that additional pressure on the strings from ball impact upsets this balanced tension momentarily with the result that the inturned or indented medial arches and their string anchorages are sprung further inward from which position they instantaneously spring back in violent reaction, producing a new speed to the game. This revolutionary resilience introduced into a racket frame is also enhanced by the shortening of these most active central string spans, due to the inturned frame arches which make these medial strings, by virtue of the reduced and shorter span lengths, tighter and more resilient than strings covering a longer span length. At the same time the impact shock stress of the ball on these overworked strings is relieved by the spring give of the inturned arches. Furthermore, it will be obvious to all that as the strings slacken from age and play as is inevitable in a racket, these previously clamped or pressed in arches 80, 83 and 3 expand simultaneously to take up this age slackening and maintain in whole or part the string tightness. Conversely, if weather conditions, which are so hard on strings and particularly in wood frames, bring undue strain on the taut strings, the give in these arches relieves this in maintaining the compensating equilibrium.

In Figure 69 is shown an adaptation of my shaped frame to a circular head and diagonal stringing. In this modified form, the indents or inturned arches are disposed on the diagonal medial axes of the head at 90, 90 and 91, 91 and are clamped inwardly as desired for stringing by the clamps, 87, 87 and 89, 89 (indicated in dotted line) while the open spring throat and spring bridge span 3 can be contracted by the clamps 5 and 6 (also indicated by dotted line) as heretofore. The interior metal or resilient reinforcing band or inner frame facing 12 also forms the spring bridge member and string anchorage 3 spanning the open spring throat. The spring bridge 3 in this case is preferably designed (though not necessarily) to curve and spring downward instead of upward at the throat when the latter is contracted and so forms a corresponding and balancing outward curving arch with the other frame arches 92, 93 and 93. Thus, when the ball impacts on the center of the racket head, the strings, preferably more closely spaced, diagonally spanning the head in centrally crossing bands between the resisting inturned arches 90 and 91, draw the latter in and thrust the intervening outward-turned arches 92, 93, 93 and 3 outward—all of which in conjunction with the so compressed interior spring ring 12 and any other additional reinforcing members as may be included (as in Figure 67) cause the subsequent violent reaction of the arches back to their normal position and the instantaneous whipping of the strings and ball. While in Figure 69, this frame and string arrangement is applied to a circular head, a corresponding arch arrangement, and with diagonal stringing, may be employed in an elongated racket head, (as distinct from the round head), by elongating the outwardly turned arches 93. This will bring the diagonal stringing into oblique crossings in relation to each other rather than right angle relationship as in the round head and produce elongated diamond meshes which give a superior grip on the ball in flat or top stroking or undercutting of the ball.

Further and modified variations of the frame shaping are indicated in Figures 70, 71 and 72, the frame clamping of which (not shown) is similar to that of Figure 67. In Figure 70, instead of the single inturned arches 80 and 83 at the top and opposed sides of the head respectively, the corresponding indentations 80a and 83a are combined with and supplemented on either side by adjoining inturned arches 80b and 83b respectively. These work collectively with the ball pressure on the central longitudinal and transverse stringing area the strings of which anchor therein or adjacent thereto and the frame clamping and the reactions are similar to that already noted as for Figure 67. This spring arch arrangement provides a flatter top and sides to the racket head and further distributes the arch action and can be used when so preferred.

Figure 71 differs from Figure 70 in having out-turned arches 80c and 83c in lieu of the centrally located inturned arches 80a and 83a of the latter, these out-turned arches being carried, so to speak, by the inturned arches 80b and 83b respectively disposed on either side of the aforesaid out-turned arches. With this arrangement, under ball string pressure, the central string supporting and so resisting out-turned arches 80c and 83c move as a whole on the adjacent inturned string supporting arches 80b and 83b which momentarily yield inwardly to the string pressure and then with arches 80c and 83c respectively fly outward to their former balanced positions.

Figure 72 is similar to Figure 70 but in addition has a series of inturned and out-turned minor arches 94 interposed between the central arches 80a and 83a and providing various string anchorages in the space of the corner main arches 84 with individual and minor spring arches and giving the frame a wave contour or form as indicated. The same additional treatment can be applied to the forming of the frames of Figure 71 and others as desired. My preferred form of stringing my rackets wherein certain portions of my head, and particularly the spans between my opposed spring arches, have bands of stringing on closer spacing crossing each other approximately on the impact center of the racket head, is made the more feasible by the non-splitting nature of my frames, notwithstanding the employment of wood therein, in connection with the straight and unstaggered alignment of my stringing holes in my preferred reinforced grooved frame.

Figures 73 and 74 indicate diagrammatically modified forms of the wrapped tubular formed members advantageously included in my spring action frames as desired. In Figure 73 the core member 50 which can be one or more strips of relatively thin and pliable balsa and/or other light semi-structural material is enveloped in a covering 46 of thermoplastic material which can be applied preferably as a sheet wrapping or in any other covering form or coating. Around this is another wrapping or covering 45 of film material preferably with high tensile strength such as cellophane (regenerated cellulose). About this is wrapped the outer tubular forming wall of the plastic impregnated paper "papreg" or equivalent 13' in the desired number of layers or plies, which under pressure with the proper heat, polymerizes or hardens to form the imtegrated tubular structure as already described. The thermoplastic element 46 is selected in relation to its fusing or liquifying temperature, in addition to its strengh and resilient properties, which in relation to the "papreg" or structural wrapping 13' must be below or anyway not above the polymerizing or hardening temperature of the latter. Commercial "vinylite" has already been suggested for such use (Figures 20 and 23) but this is only one of a large field of available materials providing proper qualifications, so that other suitable substitute materials which will liquify and harden at the proper aforesaid temperatures may be used for 46 including thermosetting material and this applies likewise to the kindred construction of Figures 20 and 23 previously described and applicable to the various forms of my frame construction.

In Figure 74 the core filler for the tubular member is composed of one or more strip layers (46a and 46b in this instance) suitably thin and pliable, of thermoplastic or equivalent material of the same nature as 46 of Figure 73 and this is likewise surrounded by a containing wrapping or envelope of cellophane or other suitable film 45 which in turn is enclosed in a wrapping of a desired number of plies of "papreg" 13' or equivalent. Both of these compounded structural forms of Figures 73 and 74 which are of the length of the frame to be formed are for use, singly or preferably in groups and with or without other lamination elements, for the molding of the racket frames or indeed any desired structural purposes.

Thus, in Figures 75 and 76 is indicated such a use of the strip form of Figure 73 where three such members are placed in the molding form as indicated in Figure 75 and, in the manner already outlined, pressure formed in compression as indicated in Figure 76. In accomplishing this, it will be understood that the heat applied as heretofore to the mold is arranged to raise same to the liquifying temperature of the fusing element 46 as for example 300 degrees F. so this develops hydraulic pressure within the wrapped and filled tube elements which are sealed and form-held at their ends with particular reference to the wrapper 45 (not shown) and this hydraulic pressure which may in this instance be 25 pounds per square inch is brought to bear normally on all surfaces of the membrane wall 45 and the structural "papreg" 13' while the polymerization of the latter is consummated. The thermoplastic or equivalent material 46 (or 46a and 46b) thereafter becomes solid again and, in its new shape on subsequent cooling and removal of the formed frame from the mold, forms an elastic and strengthening core within the strong "papreg" tube-like members and about the light cores 50. In this connection in order to reduce the weight of the plastic element 46 as well as cheapen same, a mixture of sawdust or wood flour (preferably of balsa wood) or other light filler can be premixed with the plastic element 46 (or 46a and 46b) in both the cases of Figures 73 and 74 as indicated in the stippled cross section.

In Figure 77 is shown a similar form of the frame using four of the elements of Figure 73 and in combination with the slotted out metal reinforcing band 11. The polymerizing and molding procedure is the same as in the case of Figures 75 and 76 only in this instance the core members 50 are not present and the "papreg" tube members with their membrane film lining 45 are entirely filled and supported within by the cooled thermoplastic 46 after the fluid pressure forming of same from within, induced by the exterior pressure applied and transmitted from the pressing top form member 24. In the case of both Figures 76 and 77, the frame cross section is provided with an inside groove 20a in addition to the outside groove 20, giving the frame cross section a strong I beam shape for resisting bending stresses at right angles to the plane of the racket while lightening the weight with a minimum amount of material used. Other combination cross sections may be similarly arranged for the frame wherein both the lamination of Figure 73 and that of Figure 74 can be combined in a variety of ways to form the frame.

In Figures 78, 79, 80 and 81 are shown alternative forming methods and structural cross sections particularly designed to permit inexpensive mass production of rackets by molding of laminated frames and of unique cross section in multiple in one forming operation which produces a large block of laminated material molded in racket shape which can then be cut up and trimmed into the individual racket frames. For this purpose a forming core 95 (collapsible or otherwise) is provided of the desired shape and about and upon this the several sheet plies of material for forming the necessary laminations as 42 and 43 are disposed. Over these, when properly positioned a fluid pressure membrane 23a in bag or diaphragm form is placed to properly envelop or cover same and with proper provision for venting the air or "bleeding" (not shown) from within the form. The prescribed fluid pressure for compressing the laminations and plastically bonding or integrating the assembled members is applied under the proper temperature on the membrane 23a to polymerize or harden the plastics or adhesives embodied in the structure, in accordance with the methods of the trade now in use for molding plywood and the like or as set forth in my co-pending application No. 492,914 already referred to.

In this connection a particularly unique feature of my invention is the grooving of the surface of the core 95 after the manner indicated in Figures 78 and 79 whereby the relatively thin and pliable laminations in loose superimposed assemblage are forced to conform to the grooves or corrugations running transversely of the core form as well as to the longitudinal shaping contour lines, grooves or curves. This produces, in the pressure molding, multiple parallel rows of concave or convex rib-like sections each approximately the width of the intended racket frame which can be subsequently cross-cut on the intended division lines producing a multiple of individual racket frames ready for final and individual trimming and shaping and of cross sections quite different from those hitherto employed in racket construction. In short the veneer and/or other laminations instead of being flat in *cross section* are curved to provide a new and greatly enhanced stress resistance and resilience whereby the laminations occupy more than one plane in cross section in addition to their longitudinal shaping, all of which is accomplished simultaneously in the pressure forming. In order to facilitate this conformation of the loose plies 42 to the corrugated core 95, the former are preferably, and particularly when of a thicker nature, scarfed at (44) on their compression side at each bending point as indicated and this in addition to any transverse scarfing of the sheets when this also is done, as already described, to conform to the longitudinal frame shaping. These laminated formations may be formed either after the manner of Figure 78 or reversely after the manner of Figure 79 and these may then be cross-cut and trimmed to produce a frame cross section (in multiple) similar to either 1b or 1c in the lamination of Figure 78, or, as in the case of Figure 79 to 1d or 1e. In all cases it will be observed that the veneers or laminations will have a unique shape within the frame section, producing strong spring and compression members for the several arches of my uniquely shaped frames as well as strong resistance to torsion and shearing and to bending stresses of the racket as a whole at right angles to the plane of the racket head. To further enhance the latter resistance as well as resistance to other stressing of the frame, I preferably, although not necessarily, lay the central veneer or ply, when of wood of an odd number of such laminations, with its grain axis at right angles or crossed with that of the other laminations which extend longitudinally with the frame, as indicated in Figure 78 and 79 and as previously described. This gives what is known as a balanced ply which it is believed is unique in tennis racket construction (where the grain of all the wood laminations is always longitudinal) and particularly when combined with the cross-curved laminations of Figures 78 and 79. While any and various forms of laminating materials can be used in this frame forming, the same as in the other various modified cross sectional structures alternatively employed in my racket frames, I preferably make the laminations 43 of plastic impregnated paper or "papreg" with wood laminations 42 of balsa and/or of stronger heavier wood as may be preferred for the case in hand. The form of the "papreg" layers 43 should be that of Figure 18 for the greatest tensile strength and in the desired number of plies or sheets per layer, or, instead, the structure of Figures 23 and 20, and in unfolded form, may be similarly employed. Still again high strength or treated wood veneers may be used for 43 in combination with light but weaker woods or materials for 42 to provide depth to the cross section but with low specific gravity. Also, for the outer or top and bottom layers 43 a highly resilient plastic sheet (as "vinylite") or the like may be substituted and this may be carried still further and be employed by itself for any or all of the interior layers 43 as well. Various combinations and substitutions can be made without departing from the spirit of the invention. Where more expensive material such as resilient thermoplastic or other sheet material is employed for the outer surface layer 43 as noted and a large part of this trimmed away in the final finishing of the individual frames as in the case of 1b for this example, this surface material can be used in strip instead of sheet form when so preferred and laid in the form in the proper spaced apart relation. In such case, for the under side, slots are provided on the corrugated form for receiving same and such an arrangement is shown on the left hand side of the form of Figure 78 at 95a. Correspondingly, on the top, the surface strips can be laid in spaced apart and properly centered positions and the pressure membrane will form itself about these in the molding. Metal band and/or wires may be similarly placed as desired and likewise to reproduce, in my mass multiple molding, the frame construction previously illustrated including such tensile members as 10, 11 and 12 therein. It should also be understood that the individual layers 42 may be, in themselves, a ply of several thinner sheets of materials which also may be composed of a variety of materials and of different specific gravity and physical properties. Thus some may be of ash in combination with balsa or light filler sheets, it being borne in mind that the preferably thicker laminations 42 may serve as the depth giving members and of low specfic gravity while the preferably thinner laminations 43 provide the main strength and resiliency with naturally a higher specific gravity which, however, is offset by the lightness of the elements included in laminations 42. The balsa and other wood or equivalent suitable materials can also be given greatly enhanced strength and hardness by plastic resin impregnation or other chemical treatment. Thus by treating same with methylolurea impregnation, either on the surface portions or more deeply, to form what has recently been developed and known as "transmuted wood," remarkably enhanced physical properties and strength can be produced in my fillers, semi-structural and likewise structural members where so employed and in any of my various and modified structures while maintaining low specific gravity to permit of reduced frame cross sections, and when wanted, inclusion of the higher specific gravity metal or other tensile and spring members, etc., and improved results in various respects can so be secured. This is particularly applicable to the core members of my tubular members 13, etc., and my other wood lamination members as in Figures 4, 11, 16, 27, 30 and the like, as well as the laminations of Figures 78 and 79. The methylolurea treatment transmutes the wood so that it is more dimensionally stable under varying conditions of atmospheric humidity, does not show grain raising, is markedly hardened, can be highly polished, is stiffer, more durable, denser, has increased wearing qualities, has much higher compressive strength as well as increased strength in tension, particularly across grain and permits either retention of the natural color of the wood or the introduction of colors by including water-soluble dyes with the impregnating chemicals, all of which can be employed to great advantage in enhancing both the structural and the aesthetic features of my frames of which full advantage may be taken. Veneers of wood so treated may also be bonded under pressure without additional adhesive or plastic bonding agents. By uniquely combining balsa wood with high tensile metal and other materials in proper proportion to their respective specific gravities in forming frames, I am able to include the highly desirable spring metal, normally excluded in a solid frame by reason of its excessive weight, and yet keep within the difficult weight limitations of the present day game, and of a still faster game, and I so proportion the respective materials in my frame construction as to maintain the desired collective specific gravity for the assemblage as a whole. When desirable in accomplishing this end, I chemically impregnate as with methylolurea or with phenol-formaldehyde or other resins, only the surface or outer skin of the balsa and other wood laminations and cores rather than the complete interior thereof so as to retain a lower specific gravity and higher flexural and impact strength (not present in the impregnated portions of the wood) while otherwise increasing the strength of the impregnated portions in accordance with established practice.

Figure 80 shows somewhat diagrammatically the molding of the sheets for multiple forming of rackets, as described, on the core 95 with the fluid pressure membrane 23a and the corrugated formation which after pressure molding is cut up to provide the several rackets. The racket shape shown is still another variation of my unique spring arched frame, combining in this instance something of the arch features of that of Figure 69 and the top of Figure 71 and is preferably strung as shown in Figure 71 and with or without the spring open throat 3 but preferably with same for maximum and balanced spring action. This spring bridge member 3 can be included and set up in multiple in the form assemblage if preferred as indicated or may be combined with the individual frames subsequently. A filler member 96 is included in the form which can either be a removable one for forming the open throat, etc., in pressing the sheet laminations against same or, where a solid wedge throat as in Figure 68 is contemplated, the filler 96 is made of suitable wood for same as well as forming a medial shank and handle filler lamination as may be desired and this is integrated with the frame sheet laminations in the molding and subsequently cross-cut as a portion of the individual frame made from the mass molded frame block. In the other case, when used as a temporary interior form member, the element 96 is properly coated or protected from adhesion the same as the rest of the form or core and the formed laminated frame block is then sprung off of this in removal.

In Figure 81 is indicated diagrammatically an alternative method for mass molding of the laminated structures of Figures 78, 79 and 80 whereby the sheets can be formed on a flattened form 97 rather than around the enclosed core 95. This has certain advantages for handling a sheet or diaphragm fluid pressure molding membrane which is superimposed on the laid lamination elements 42 and 43 in assemblage. After the mass molding and either before or after the cross-cutting of the frame block or shell so formed into the individual frame units, the molded shell— or the frame units as the case may be—is bent or contracted together along the shank and handle portion on radial lines as 98, 98 and the opposed shank and handle portions (with or without a filler section) joined together and properly bonded and anchored to form the enclosed racket head, etc. With this in mind, the arch portion as 80c is molded flatter than its normal or final shape so as to bend to or toward the latter, or later shape of the head frame. In some instances it may be found also necessary to provide some scarfing as 44a on the compression or under side of 80c to sufficiently or adequately provide for this final bending of the shell. Where the frame is made in halves as for my turnbuckle form, this, of course, is not necessary and the mass shells of the half frames can be formed or molded as in Figure 81 on a simple flat or horizontal form with corresponding ease.

In general it should be understood throughout that in the various cross sectional figures showing lamination combinations, etc., which are more or less diagrammatical, no attempt is made to depict, accurately or fully, allowance for compression of the materials and in different directions which will occur in the molding and will vary with the nature of the materials employed, etc., and of course must be properly provided for in each respective case in the design of the molds, cutting and dimensioning of materials, etc. The combination of materials as well as the assemblage and forming procedure also may be greatly varied and modified without departing from the spirit of the invention. It will also be understood that I do not limit my frames and rackets to the specific cross sectional construction or varieties of the construction illustrated herein as other various unique features of my rackets can be employed in various other rackets of a different nature and of other types and construction, including metal and hollow tubular frames. Likewise the shape of the various parts of the racket and particularly the shapes of the head and likewise the arrangement of the stringing of same may be greatly varied from the details set forth without departing from the scope of the invention and likewise can be applied to other types of rackets as a part of and in application of this invention. Similarly, I do not limit my unique frame construction and methods of forming same to rackets alone, as I am aware that the construction and methods can be applied in other structural fields and for other purposes, particularly where my high strength-weight ratios and other desirable features are sought or found advantageous.

Thus, while I have shown and described my invention in a preferred form I am aware that various changes and modifications may be made therein without departing from the principles of the invention, the scope of which may be determined by reference to the appended claims.

I claim as my invention:

1. A laminated racket frame including laminations of thin sheet material of a relatively somewhat brittle nature in combination with a surface covering of superimposed fibers of relatively good flexural value and disposed substantially on a predetermined stress resistance axis.

2. A racket frame including a longitudinally disposed tubular sleeve-like member and a preformed structural lamination with apertures therein, said sleeve-like member being disposed on one side of said apertured lamination and integrated with said lamination and projecting into apertures thereof.

3. In a resilient racket for hitting games, a frame including two pairs of opposed inturned arches, each pair having a span of stringing extending between and firmly anchored to same under high tension and with the span between one pair of said arches extending crosswise of the span between the other pair of said arches.

4. A resilient racket head comprising a frame having opposed inturned arches and oppositely disposed bands of stringing crossing each other substantially centrally of the head and terminally anchored in opposed inturned arches and having strings thereof in more closely spaced relation than strings in other portions of the head.

5. A racket frame including at least one curved arch normally repeatedly subjected to distortion, said arch comprising a plurality of strong independent fibers of substantial tensile strength disposed longitudinally of same and held together and against disruption by such distortion, in part at least, by a hardened adhesive substance and a tubular casing including filaments of high tensile strength.

6. A racket having a contractable open throat and a flexible resilient spring bridge having a string-supporting arch portion which springs inward of the head coincident with the contraction of said throat, said arch having its central portion which holds the two central longitudinal strings disposed at least as far away from the transverse axis of the head as the immediately adjacent portions of said arch which hold the first longitudinal strings next adjacent to said central longitudinal strings.

7. In a resilient racket of the class described, a plurality of string spans firmly anchored to an inturned arch forming the main body of the frame at the outer extremity of the head.

8. A resilient racket frame designed to hold firmly stringing under tension in the head portion and formed and shaped as a resilient inturned arch at a position in the head located substantially away from the throat and inner end portion of the head.

9. A racket frame having a resilient head designed to hold firmly stringing anchored therein, the opposed inner and outer perimeters of said head frame each describing at the same point of said frame an arch inturned in relation to said head at at least one place substantially distanced from the throat and inner end portion of said head.

10. A racket frame having a resilient head portion including at least one elongated tubular structural element having its body shaped to describe a plurality of curvilineal arches positioned consecutively longitudinally of the frame and at least one of said arches being inturned of the head and located in the head substantially distant from the throat and inner end of the head and at least one of said arches being designed to hold firmly stringing anchored thereto under tension.

11. A racket frame of the class described formed as an inturned resilient arch in the outer extremity of the head and at least each of two opposite sides of said arch including a reinforcing overlay of structural material to increase the strength and resiliency of same.

12. A resilient racket frame of the class described, said frame being shaped as an inturned arch at at least one position in the head substantially distant from the throat and inner end portion of the head, said arch having at least its convex side reinforced with resilient material of substantial tensile strength.

13. A resilient racket frame of the class described, having its body formed at a position substantially spaced away from the throat and inner end portion of the head as an arch, inturned in relation to the head and interposed between two arches which are outturned in relation to the head, and each of said arches having at least its convex side reinforced with resilient material of substantial tensile strength.

14. In a racket of the class described, a resilient head having in combination a resilient frame, the body of which at least in the outer extremity of said head is shaped as a plurality of consecutively disposed arches of resilient construction, some of which are inturned and some outturned with respect to said head, and a plurality of string lengths firmly anchored under tension to at least two of said arches.

15. A resilient racket head comprising a frame having opposed inturned arches of its body and oppositely disposed bands of stringing crossing each other within the area of said head and terminally firmly anchored to opposed inturned arches under tension.

16. In a racket head having longitudinal and transverse stringing therein anchored to the frame under tension, a plurality of the longitudinal string spans in approaching the outer extremity of said head crossed in pairs on each other before anchoring in the outer extremity of said head frame, the two longitudinal strings which at their outer extremity are anchored nearest to the central longitudinal axis of the head, however, being crossed not on each other but each, instead, being crossed on another longitudinal string which anchors to the frame at a point which is spaced at least more than one longitudinal string-anchorage point on said frame away from the central longitudinal axis of the head.

17. In a racket frame of the class described, an elongated resilient structural member having a portion arched inwardly of the racket head and designed to serve as an anchorage for a plurality of string spans and a longitudinally extending portion of said member on each of the two sides of such inwardly arched portion arching outwardly of said head so that when and if said inwardly arched portion is sprung inwardly of the head, said outwardly arching adjoining portions coincidentally are sprung outwardly of the head.

18. A racket frame, of the class described, including a resilient head portion having at least one longitudinally extending tubular structural wall element comprising non-metallic filaments of substantial tensile strength and a strong adhesive substance, said tubular wall element conforming, and in compressed relationship therewith, to a non-metallic compressed core which is deformed in cross section, as compared to a true circle, for at least a substantial length, and united with said core by an adhesive substance.

19. In combination in a racket for hard hitting games having a resilient co-acting organization of both frame and stringing, a frame formed as a string supporting inturned arch at at least one location spaced away from the throat end within the head and designed to react resiliently inward of the head in conjunction with ball impact on the stringing, and stringing under high tension in the head with stringing firmly anchored to and along said arch span.

20. A racket frame having a highly resilient organization including an adjustable expanding element in combination with an inturned string supporting arch at the outer extremity of the head, said expanding element being located in said inturned arch.

21. A racket frame having a contractable head and means for expanding same located in an inturned arch in the head frame disposed at a point spaced away from the throat.

22. A racket head including string supporting portions forming a plurality of inturned resilient arches at least one of which is spaced away from the throat and designed to react briefly inwardly to ball impact on said strings.

23. A racket head including string supporting portions forming a plurality of resilient inturned structural arches spaced away from the throat in combination with resilient metal elements disposed in at least portions of said inturned arches which are subjected more particularly to tensile strains in stringing and playing and so as to thereby accentuate the resilient action of said arches and strengthen same.

24. A racket frame including a plurality of resilient inturned arches spaced away from the throat and means for firmly anchoring stringing under tension to said arches.

25. A racket having at least one inturned arch in the head which by bending inward will permit contraction of the head, said arch including wood laminations in combination with at least one construction resisting member including an element of relatively high tensile strength and resilience disposed at least in the inward and so tension side of said inturned arch.

26. A racket frame including wood laminations with their grain axes disposed approximately longitudinally of the frame and a resilient contractable throat in bonded combination with a resilient metal reinforcement bridging said throat and having extending prongs piercing adjacent wood of said frame, said prongs having side faces which are wider than their edges and said faces being disposed substantially parallel with the general longitudinally disposed grain axis of said wood.

27. A laminated racket frame including a plurality of skeletonized longitudinal metal strips with continuous outer edges connected by an apertured web forming spaced apart struts by having substantial portions of said metal cut out for apertures in same and including in combination therewith at least one longitudinal membranous strip of nonmetallic fibrous material combined with an adhesive substance, the several strips being bonded together and with said metal strips also mechanically bonded with the fibrous material as well as adhesively joined thereto and by having said figrous material projecting into said apertures in the metal strips in molded conformity therewith resulting from said combined fibrous and adhesive material being in an uncured, highly pliable, moldable, plastic state while being molded into said apertures and subsequently finally cured and hardened.

28. A resilient laminated racket frame including metal reinforcing in combination with strips of wood of extremely low density and multiple paper-thin plies of fibrous material of high tensile strength combined with an adhesive substance and mechanically interlocking with said metal reinforcing by reason of said fibrous material projecting into and filling substantial apertures formed in said metal strips in molded conformity therewith in addition to being adhesively bonded to said metal by said adhesive substance in a finally hardened state.

29. A racket frame including a plurality of light weight cores disposed longitudinally thereof in combination with shell coverings of heavier material of high tensile strength enveloping said cores and permanently bonded in close adhesive union therewith as in a pressure molded union.

30. A resilient racket frame including in integrated combination a plurality of structural walls in tubular formation curving longitudinally and extending throughout at least the greater portion of the head frame and in laminated relation with each other and at least one filler within said formation, said walls and core filler being bonded together by an adhesive substance.

31. A resilient racket frame including a core filled tubular structural shell of longitudinally curvilinear form, said shell including a plurality of thin sheet-like laminations, each such lamination extending circumferentially in a continuous sheet form around said core, taken transversely, and said core including a plurality of strips and said shell laminations and filler strips being all bonded together with an adhesive substance.

32. A laminated racket frame in which the laminations forming the head portion include a longitudinal strip of fibrous nature having a general grain axis extending in one direction and a structural fibrous strip bent at least partially around same and having a general grain axis disposed in a substantially different direction from that of the other strip and both strips extending along a substantial length of said head portion.

33. A laminated structure including at least one layer of sheet material impregnated with thermosetting plastic and wrapped around at least one thermoplastic lamination.

34. A racket frame having a head expanding element in combination with a plurality of pairs of strings disposed longitudinally of the head, each such pair crossing each other on a transverse string in the outer extremity of the head and, with the exception of the pair disposed centrally of the head, having each of its strings anchored in the extremity of the frame at a distance from the central longitudinal axis of the head different from that of the other and having the two strings of the pair disposed centrally of the head anchored in the extremity of the head equidistantly from and on opposite sides of the central longitudinal axis with respect to each other but with a plurality of string anchorages interposed between them and so that by expanding said expanding element the aforesaid pairs of longitudinally disposed strings are drawn tighter by pulling the respective extermities of each pair away from each other, said expanding element being centered on said longitudinal axis.

35. In combination in a racket for hitting games, at least one inturned string supporting arch disposed in the outer extremity of the head and an adjustable expander combined with said inturned arch and stringing so disposed within the racket head that a plurality of longitudinal strings on each side of the longitudinal central axis of the head have the opposite end portions of each such string anchored on opposite sides of said central axis, said expander being centered on said axis and in relation to the longitudinal strings and so that by expanding said expander said plurality of longitudinal strings are drawn at their outer extremity to a higher tension.

36. In combination in a racket for hard hitting games having a resilient co-acting organization of both frame and stringing, a laminated frame, at least one inturned string supporting arch therein disposed at a point spaced away from the throat within the head and designed to react resiliently inward of the head in conjunction with ball impact on the stringing, and stringing under high tension in the head with stringing firmly anchored to and along the arch span and spaced closer together than stringing at more distant points therefrom so as to increase the percentage of stringing reacting directly with said arch span.

37. In combination in a racket for hitting games having a handle, shank and head with stringing therein, a plurality of laminations bonded together, and including at least one lamination with high tensile spring properties, and forming a substantially solid frame with at least one inturned arch spaced away from the throat end and within the head and stringing in resilient, co-acting, firmly anchored relation with and sustained by said arch under high tension so as to react in unison with same.

38. In combination in a racket for hitting games having a handle, shank and head with stringing therein, said head having a frame including an inturned arch, defining said frame at a point spaced away from the inner and throat end of the head, and means, including stringing firmly anchored under high tension to said arch, for causing said arch to spring inward of the head and out again resiliently in conjunction with ball impact on said stringing.

39. A racket for hitting games comprising a head, shank and handle and stringing under substantial tension firmly anchored in the head, said head having a frame describing an inturned arch, located in the outer portion of said head, as distinct from the throat end, said arch being designed to sustain resiliently stringing firmly anchored thereto under substantial tension, and with ball impact on said stringing.

40. A racket for hitting games having stringing under substantial tension firmly anchored to a supporting frame, said frame being formed as an inturned arch at its outer extremity with at least a portion of said arch of a different transverse cross sectional area from adjacent portions of said frame.

41. A racket frame describing at least one string supporting inturned arch, disposed at a point spaced away from the throat and inner end portion of the head and having spring-like reaction to ball impact on the strings supported by said arch, and resilient reinforcement combined with said arch and designed to increase said spring-like reaction and strengthen said frame.

42. A racket frame with stringing under high tension firmly anchored therein and including laminations of non-metallic material and in the outer portion of the head at least one string supporting inturned arch formed by the body of the frame and having a plurality of strings firmly anchored to itself, said arch being designed to spring inwardly of the head in conjunction with ball impact on the stringing and having at least one resilient metallic reinforcement bonded at least with an adhesive substance to at least one of said non-metallic laminations so as to resist said inward springing of said inturned arch, increase reaction thereof and reinforce the frame.

43. A racket frame including at least one inturned resilient arch subject to deflection inward of the head, said arch comprising non-metallic material with glass fibres disposed at least in the tensilely stressed zone of said arch with relation to said deflection so as to increase resistance to such stressing and the resilient reaction of said arch thereto.

44. A racket including in combination in the head, opposed resilient outturned arches defining the sides of same, a resilient inturned arch defining the central outer extremity of the head and stringing firmly anchored to said arches under high tension.

45. In combination, in a resilient tennis racket frame holding in firmly anchored position thereon stringing under high tension, strong outturned resilient side arches supporting an outer end describing a resilient inturned arch firmly holding a portion of said stringing.

46. In combination in a resilient racket frame, a plurality of co-acting arches forming a part thereof for holding stringing woven through receiving holes therein under resilient tension and comprising opposed outturned arches forming the sides of the head and tending to cause elongation of the head coincident with pressure on the stringing and an inturned arch located at the outer extremity of said head which tends to spring inward of the head coincident with said pressure on said stringing and so neutralize, at least in part, said elongation of said head.

47. A resilient racket for hitting games having a head with stringing woven therein under pressure, the frame defining said head including at least a substantial amount of non-metallic material subject to enlargement from absorption of atmospheric moisture, whereby said frame is enlarged and said tension on said stringing is consequently increased, and an inturned arch forming the body of said frame in an outer portion of said head and designed to spring inward and so help to relieve increasing tension on at least a portion of said stringing by springing inward of said head coincident with said enlargement and increasing pressure on said stringing.

48. In combination in a racket for hitting games, at least one resilient, shock-absorbing, inturned arch defining the frame in an outer portion of the racket head and stringing firmly anchored under tension to said arch so that said arch and said stringing react resiliently, and as a single unit, to ball impact on said stringing.

49. A resilient racket including a frame formed as an inturned arch at at least one position in the outer portion of the head and having stringing firmly anchored to said arch under tension, said arch providing a tension compensator in relation to the stringing by springing inward of the head, coincident with increasing pressure from said stringing, and moving outward of the head automatically and tightening said stringing, coincident with the tension of said stringing slackening as occurs, for example, with certain changes of atmospheric conditions, stretching and the like.

50. A resilient racket frame with stringing woven through holes therein under substantial tension and having a plurality of central longitudinal strings firmly held at the throat end of the head by a stiff structural anchorage and at the opposite end of the head by an inturned arch forming the central extremity of said frame and springing inward of said head in conjunction with the pressure of ball impact on said central longitudinal strings.

51. A racket frame including a resilient head of somewhat acorn-like shape having somewhat flattened ends as compared with a conventional oval head and shaped as an inturned arch in the outer extremity of the head, said arch being designed to hold firmly stringing anchored thereto under tension and react resiliently as a unit therewith to ball impact on said stringing.

52. In combination, in a racket frame with a resilient head, sharply outturning arches approaching the throat portion forming a wide base for the head portion in comparison with that of the conventional oval head, and strong outturning side arches resisting inward collapse and supporting an outer end narrowed in relation to said base and shaped and formed as a resilient inturned arch with means for firmly holding stringing anchored thereto so that said arch and stringing react as a unit to ball impact on said stringing.

53. A racket comprising a resilient head and stringing firmly anchored thereto under substantial tension and having a relatively narrower outer end as compared with a broader base and adjacent the throat, said outer end being shaped and formed as a resilient inturned arch firmly holding portions of said stringing and reacting resiliently inward of the head in conjunction with ball impact on said stringing, the opposed sides of said head being defined by pronounced outturned arches shaped with their inner end approaching the throat turning sharply inward, as compared with a conventional oval head, and the longitudinal length of the head correspondingly shortened.

54. A racket frame formed as an inturned arch at the outer extremity of the head, said arch including non-metallic structural material and longitudinally disposed resilient filaments, said filaments having high tensile strength and resistance to taking "a set" and being substantially immune to moisture absorption and furthermore anchored to the frame at least at both ends of said arch.

55. A racket frame having a head portion including a plurality of laminations bonded together and shaped to form an inturned arch and vulnerable to separation under stressing, said laminations of said arch being held together, at least in part, by an embracing casing bonded therewith by an adhesive substance and intimately conforming therewith and including filaments of high tensile strength and immune to moisture absorption.

56. A racket frame including material subject to expansion from moisture absorption and forming at least one laminated curved arch therein, said arch being encircled by material including filaments of high tensile strength immune to moisture absorption.

57. A racket including at least one curved arch, which is normally subjected to repeated distortion, having laminations adhesively joined and so forming joints subject to separation by said distortion, as from play and/or moisture absorption, in combination with a cross tie of said joints by super-imposed material including fibers immune to moisture absorption.

58. A racket frame having at least one curved laminated arch which is normally subjected to repeated distortion and is formed of materials of different moisture absorption coefficients and correspondingly different elongation under an increase of atmospheric moisture, the laminations of said arch being held together, at least in part, by wrapping of high tensile strength, bonded thereto by an adhesive substance, and including strong tensile filaments immune to moisture absorption.

59. A racket frame normally subjected repeatedly to heavy impact stresses and having at least one curved arch subjected to distortion under such stressing, said arch including a non-metallic core encased in a substantial hardened structural non-metallic shell comprising filaments of high tensile strength and hardened adhesive.

60. A racket frame having an open throat spanned by a bridge at its upper end, and including structural overlays on the shoulders of the frame, said overlays extending down the shanks defining said open throat and without any one such overlay spanning the frame at the base of the throat, said shoulders and shanks being of laminated construction with laminations held together by means including hardened adhesive and said overlays which extend crosswise of the edges of said laminations.

61. A racket frame, including moisture absorbing material and normally subject to warping, reinforced on the shoulders with overlapping laminations in stepped formation on opposed faces thereof, said laminations comprising high tensile strength filaments, immune to moisture absorption, and hardened adhesive.

62. A racket frame including at least one longitudinally extending tubular shell comprising longitudinally extending filaments of high tensile strength and immune to moisture absorption, imposed on material subject to moisture absorption and consequent expansion, and including a hardened adhesive substance.

ROY H. ROBINSON.

(References on following page)

REFERENCES CITED

The following references are of record in the file of this patent:

UNITED STATES PATENTS

| Number | Name | Date |
|---|---|---|
| 644,877 | Slazenger | Mar. 6, 1900 |
| 879,477 | Kruger | Feb. 18, 1908 |
| 971,773 | Mueller | Oct. 4, 1910 |
| 1,165,484 | Zimmerman | Dec. 28, 1915 |
| 1,212,038 | Flaxman | Jan. 9, 1918 |
| 1,423,900 | Agutter | July 25, 1922 |
| 1,483,847 | Halkett | Feb. 12, 1924 |
| 1,635,943 | Larned | July 12, 1927 |
| 1,682,199 | Smilie | Aug. 28, 1928 |
| 1,721,897 | Cardwell | July 23, 1929 |
| 1,733,960 | Godfrey | Oct. 29, 1929 |
| 1,831,350 | Hall | Nov. 10, 1931 |
| 1,921,164 | Lewis | Aug. 8, 1933 |
| 1,921,616 | Hall | Aug. 8, 1933 |
| 1,951,983 | Kellett | Mar. 20, 1934 |
| 1,982,448 | Nash | Nov. 27, 1934 |
| 2,003,752 | Landt | June 4, 1935 |
| 2,009,265 | Hirschfield | July 23, 1935 |
| 2,023,843 | Kleinman | Dec. 10, 1935 |
| 2,029,193 | Reach | Jan. 28, 1936 |
| 2,034,444 | Rauch et al. | Mar. 17, 1936 |
| 2,062,088 | Dreyer | Nov. 24, 1936 |
| 2,085,960 | Donisthorpe | July 6, 1937 |
| 2,097,616 | Davis | Nov. 2, 1937 |
| 2,132,780 | Davis | Oct. 11, 1938 |
| 2,171,223 | Robinson | Aug. 29, 1939 |
| 2,181,164 | Alexander | Nov. 28, 1939 |
| 2,224,567 | Reach | Dec. 10, 1940 |
| 2,282,195 | LeCompte | May 5, 1942 |
| 2,285,031 | Hickman | June 2, 1942 |
| 2,316,880 | Miller | Apr. 20, 1943 |
| 2,322,962 | Dickson et al. | June 29, 1943 |
| 2,406,843 | Luth et al. | Sept. 3, 1946 |
| 2,428,325 | Collins | Sept. 30, 1947 |

FOREIGN PATENTS

| Number | Country | Date |
|---|---|---|
| 1,643 | Great Britain | A. D. 1894 |
| 9,123 | Great Britain | A. D. 1910 |
| 75,244 | Switzerland | Oct. 20, 1916 |
| 227,587 | Great Britain | Jan. 22, 1925 |
| 265,868 | Great Britain | Feb. 17, 1927 |
| 305,412 | Great Britain | Feb. 7, 1929 |
| 307,157 | Great Britain | Mar. 7, 1929 |
| 335,135 | Great Britain | Sept. 18, 1930 |